(12) United States Patent
Carr, Jr.

(10) Patent No.: US 10,700,469 B2
(45) Date of Patent: Jun. 30, 2020

(54) MODULAR ELECTRICAL WIRING SYSTEM AND METHODS THEREFOR

(71) Applicant: Frederick Earl Carr, Jr., Three Rivers, MI (US)

(72) Inventor: Frederick Earl Carr, Jr., Three Rivers, MI (US)

( * ) Notice: Subject to any disclaimer, the term of this patent is extended or adjusted under 35 U.S.C. 154(b) by 284 days.

(21) Appl. No.: 14/399,994

(22) PCT Filed: May 6, 2013

(86) PCT No.: PCT/US2013/039706
§ 371 (c)(1),
(2) Date: Nov. 10, 2014

(87) PCT Pub. No.: WO2013/169650
PCT Pub. Date: Nov. 14, 2013

(65) Prior Publication Data
US 2020/0106205 A1  Apr. 2, 2020

Related U.S. Application Data

(60) Provisional application No. 61/644,426, filed on May 8, 2012.

(51) Int. Cl.
*H01R 13/514* (2006.01)
*H01R 4/50* (2006.01)
*H01R 13/66* (2006.01)

(52) U.S. Cl.
CPC ......... *H01R 13/514* (2013.01); *H01R 4/5008* (2013.01); *H01R 13/66* (2013.01)

(58) Field of Classification Search
CPC .... H01R 9/2408; H01R 13/514; H01R 13/66; H01R 4/5008
(Continued)

(56) References Cited

U.S. PATENT DOCUMENTS 4,918,258 A    4/1990 Ayer
5,762,525 A    6/1998 Candeloro
(Continued)

FOREIGN PATENT DOCUMENTS

WO         9207396 A1    4/1992
WO      2013169650 A1   11/2013

*Primary Examiner* — Gary F Paumen
(74) *Attorney, Agent, or Firm* — Dinsmore & Shohl LLP

(57) ABSTRACT

A modular electrical wiring system, methods and components thereof, for connecting electrical devices to structural wiring. The system may include a base modular unit having a first electrical connection feature and one or more dependent modular units each having an electrical device, a first electrical connection feature and second electrical connection feature electrically and mechanically interconnectable with a first electrical connection feature of another modular unit. The modular units are may be assembled sequentially along a first axis by being rapidly interconnectable with adjacent modular units by relative movement therebetween in a direction perpendicular to the first axis. When modular units are connected in a mechanical series, electrical devices in the modular units may be functionally electrically in series or parallel, depending on the internal wiring of the upstream modular unit. Modular devices may have a switch to provide a choice between a series or parallel connection.

18 Claims, 21 Drawing Sheets

(58) Field of Classification Search
USPC .......................................................... 439/717
See application file for complete search history.

(56) References Cited

U.S. PATENT DOCUMENTS

| | | | |
|---|---|---|---|
| 6,233,167 B1 | 5/2001 | Chen et al. | |
| 7,753,740 B2 * | 7/2010 | Carolis | H01R 9/2491 |
| | | | 439/717 |
| 7,804,026 B2 | 9/2010 | Libby et al. | |
| 7,931,198 B2 | 4/2011 | Hall | |
| 7,948,208 B2 | 5/2011 | Partovi et al. | |
| 8,074,680 B2 * | 12/2011 | De Carolis | F15B 13/0857 |
| | | | 137/560 |
| 8,629,652 B2 | 1/2014 | Partovi et al. | |
| 9,122,449 B2 | 9/2015 | DeSilva et al. | |
| 2003/0040276 A1 * | 2/2003 | Corn | H04H 20/48 |
| | | | 455/42 |
| 2009/0142970 A1 | 6/2009 | Patel et al. | |
| 2009/0239402 A1 | 9/2009 | Byrne | |

* cited by examiner

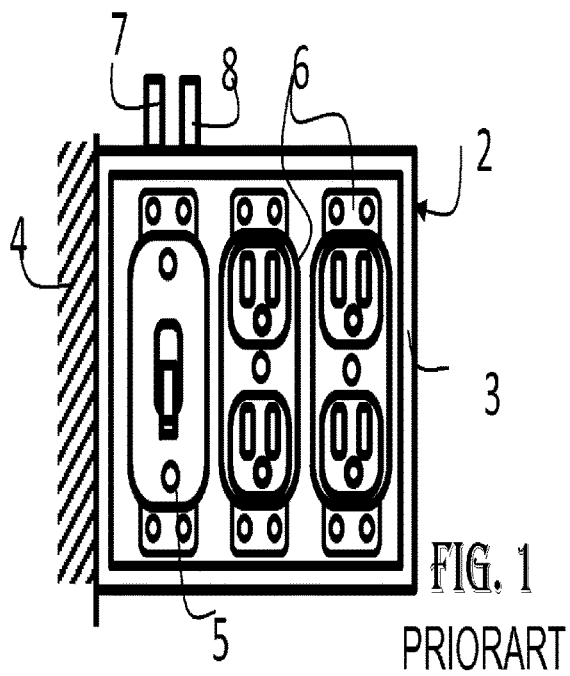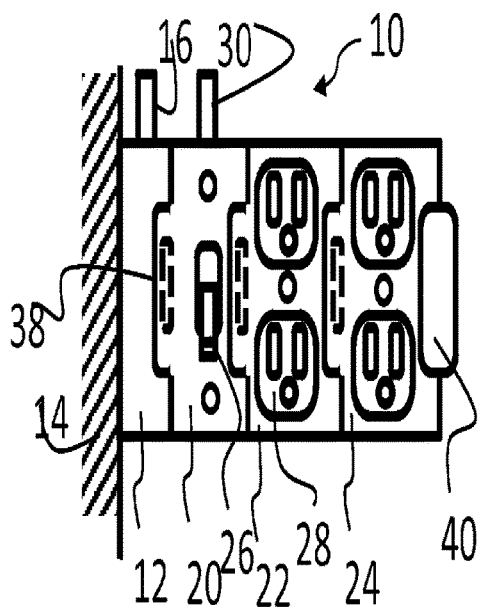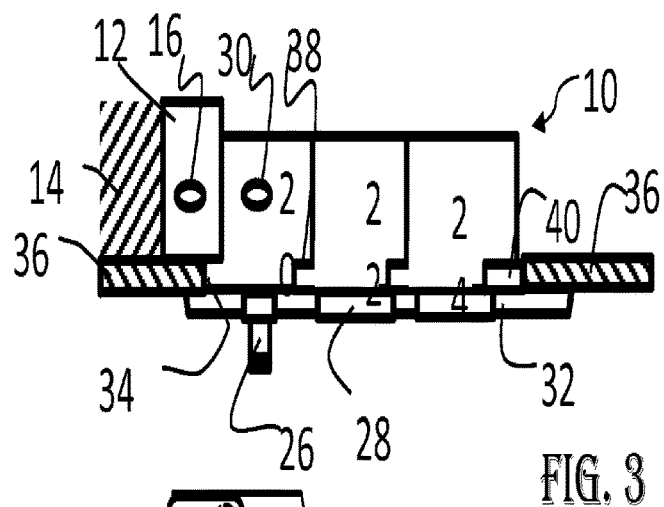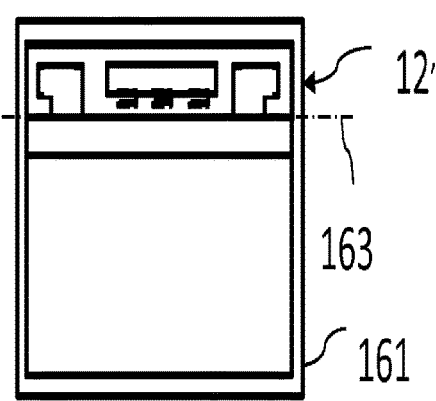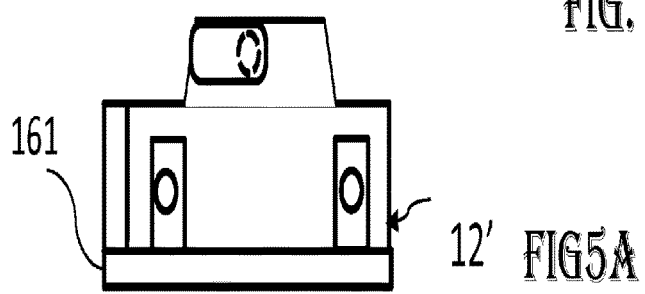

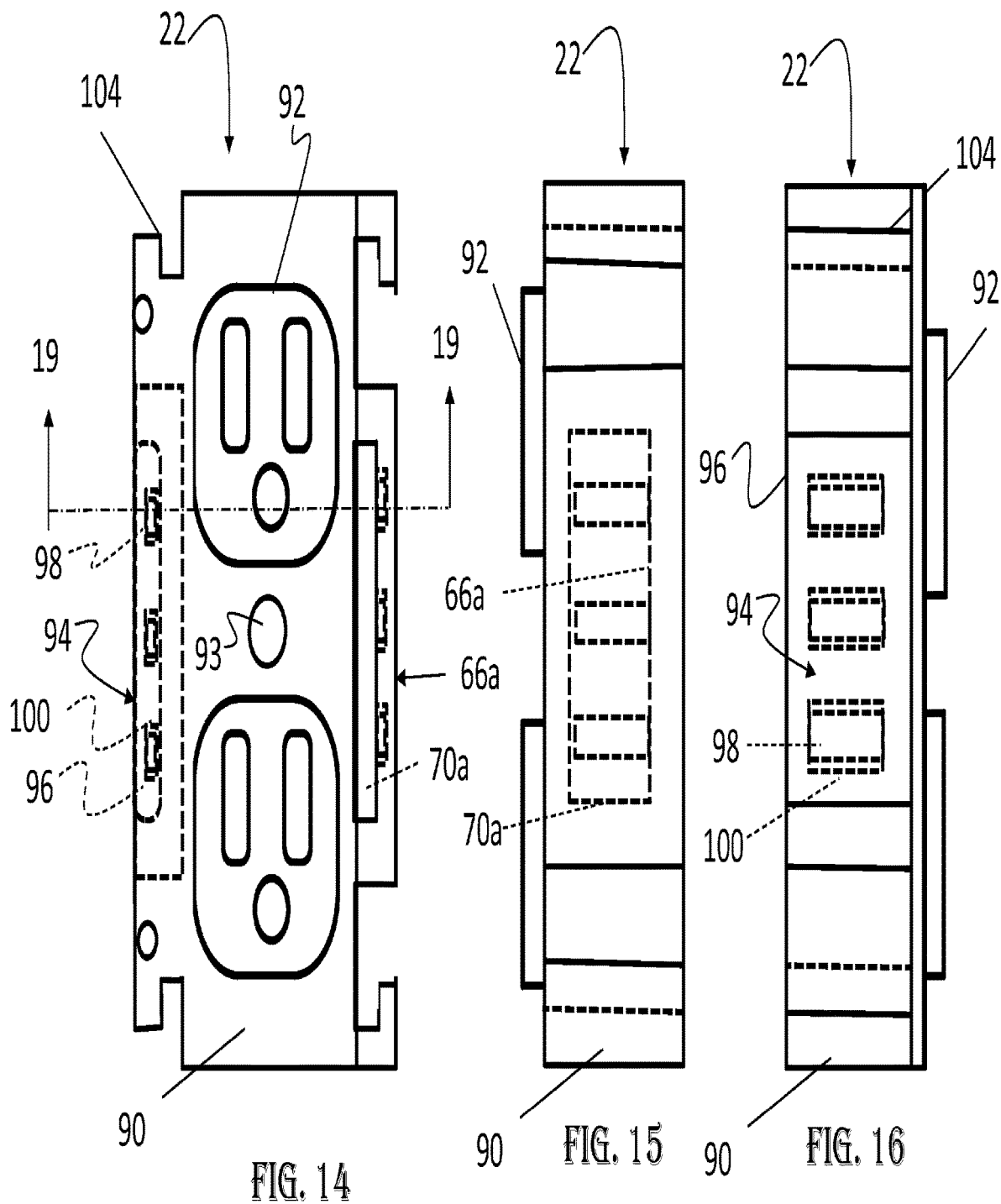

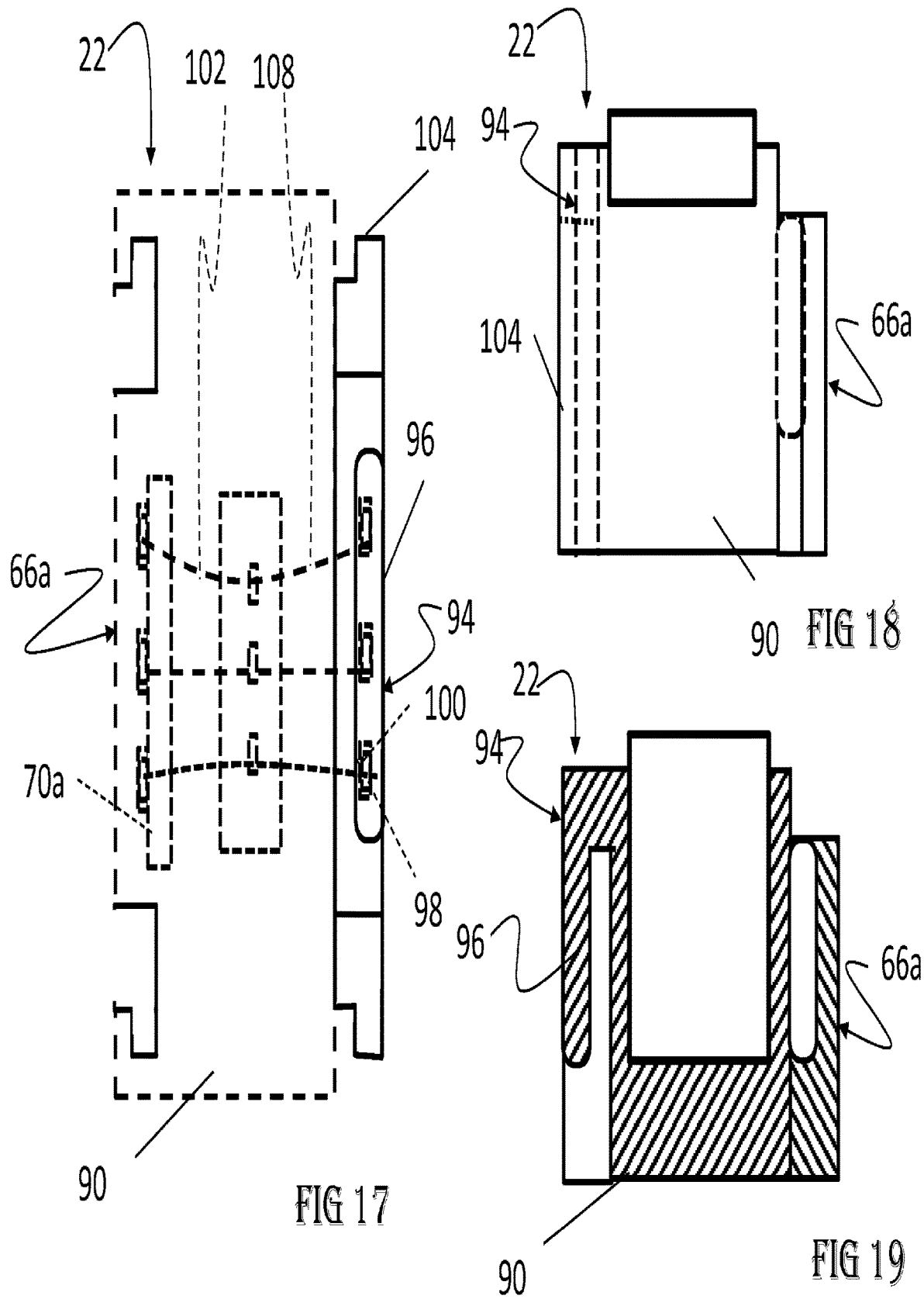

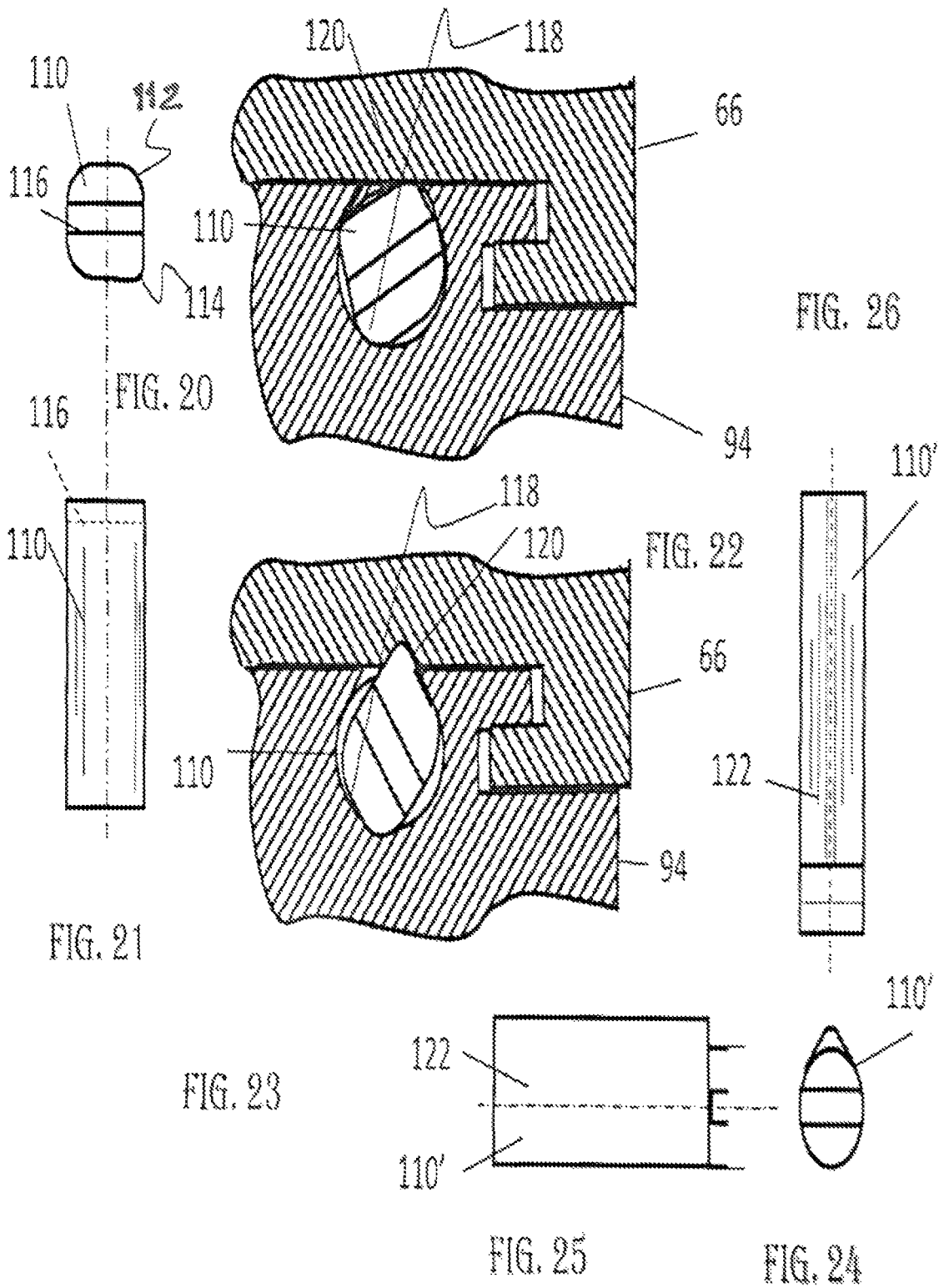

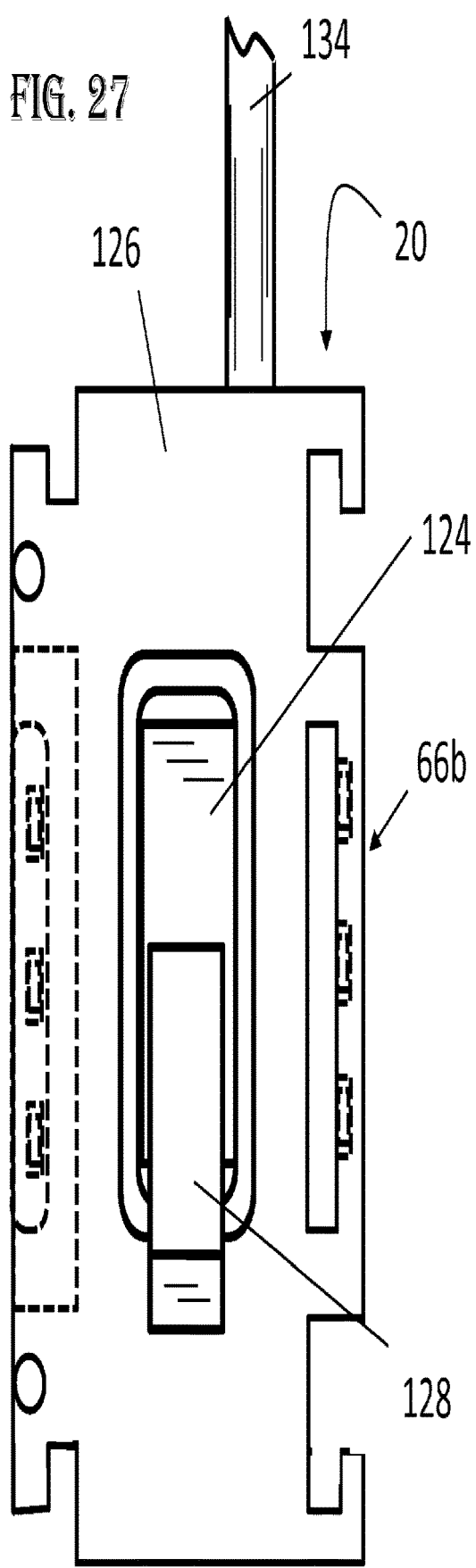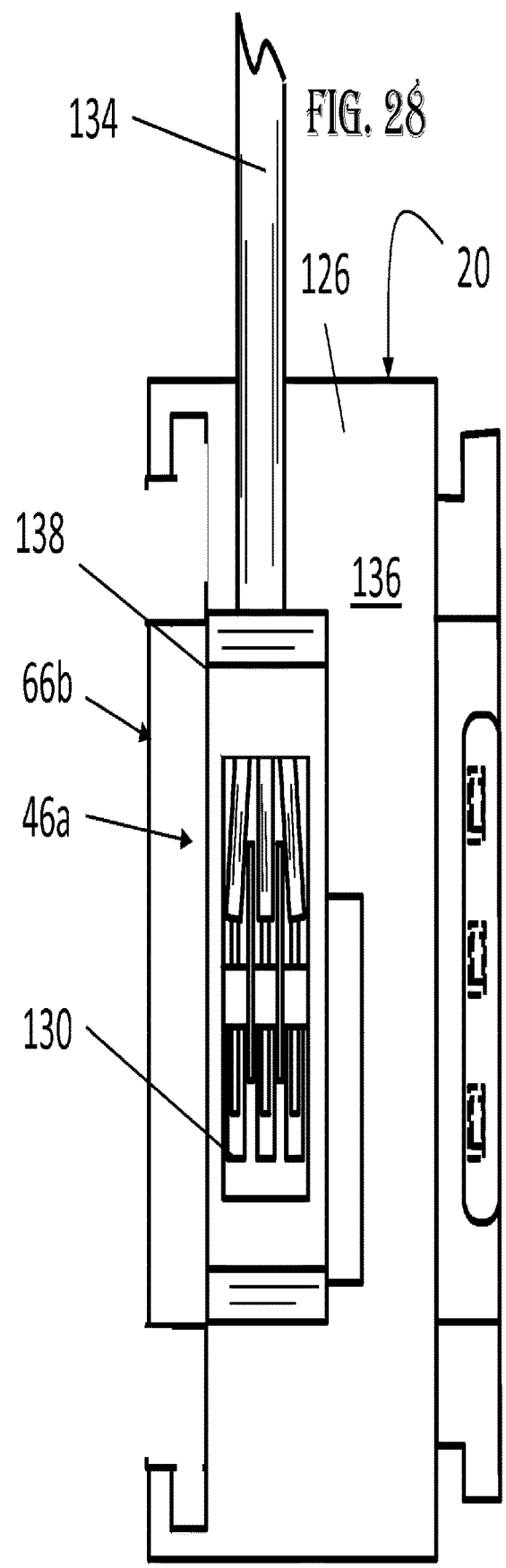

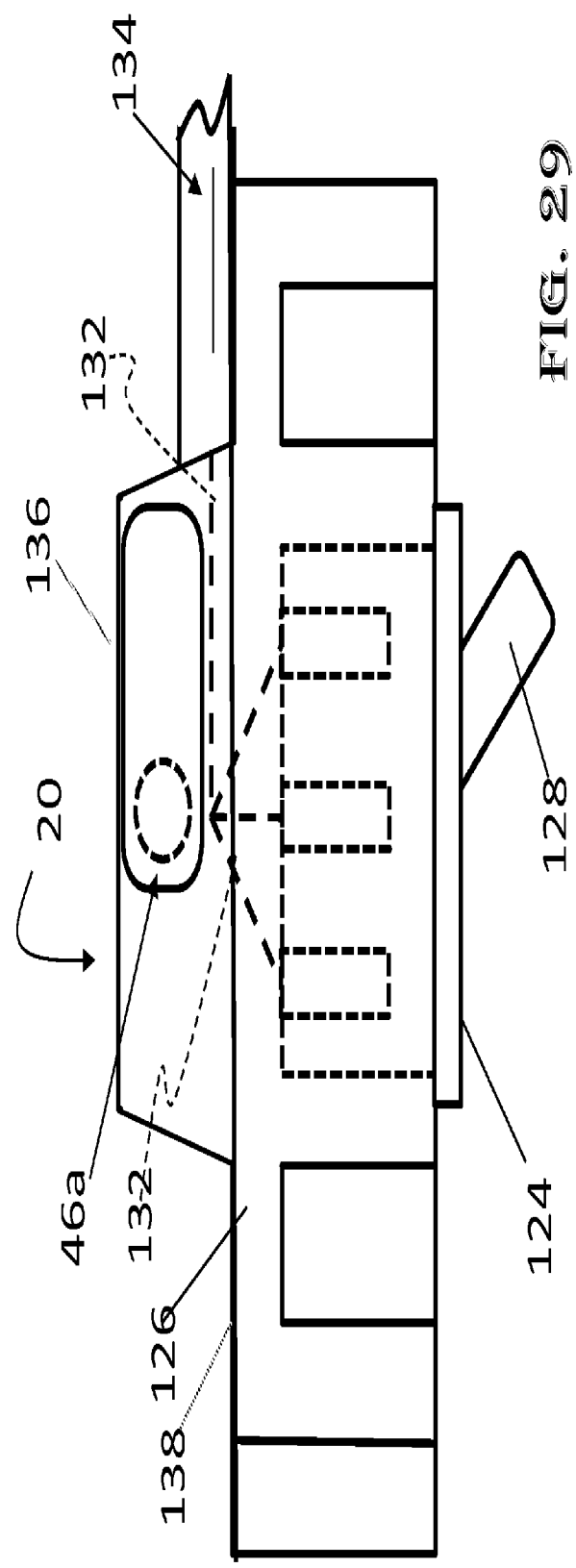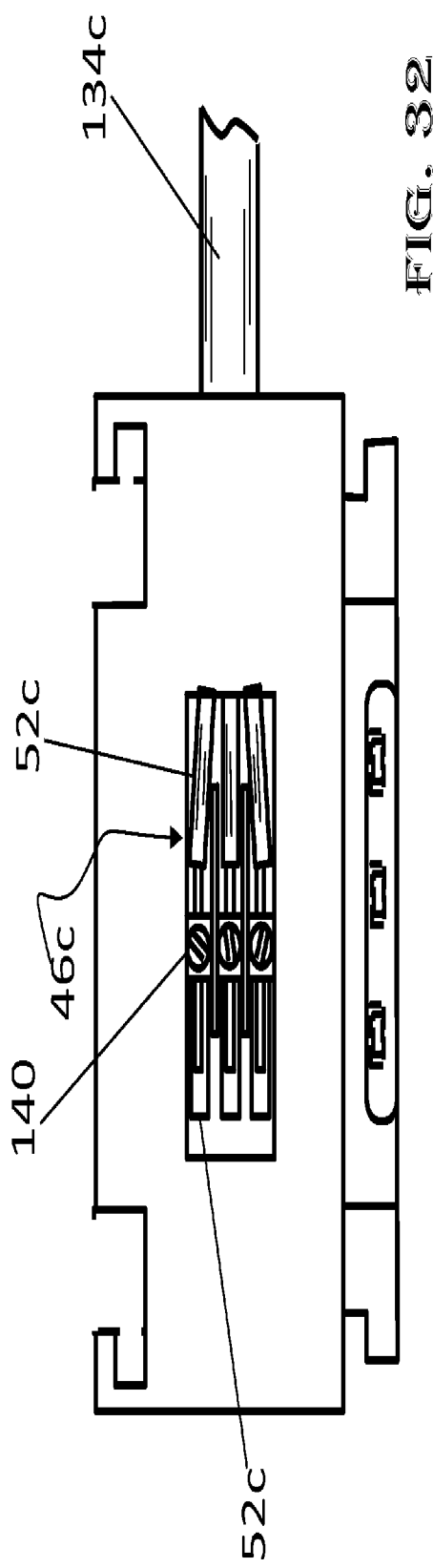

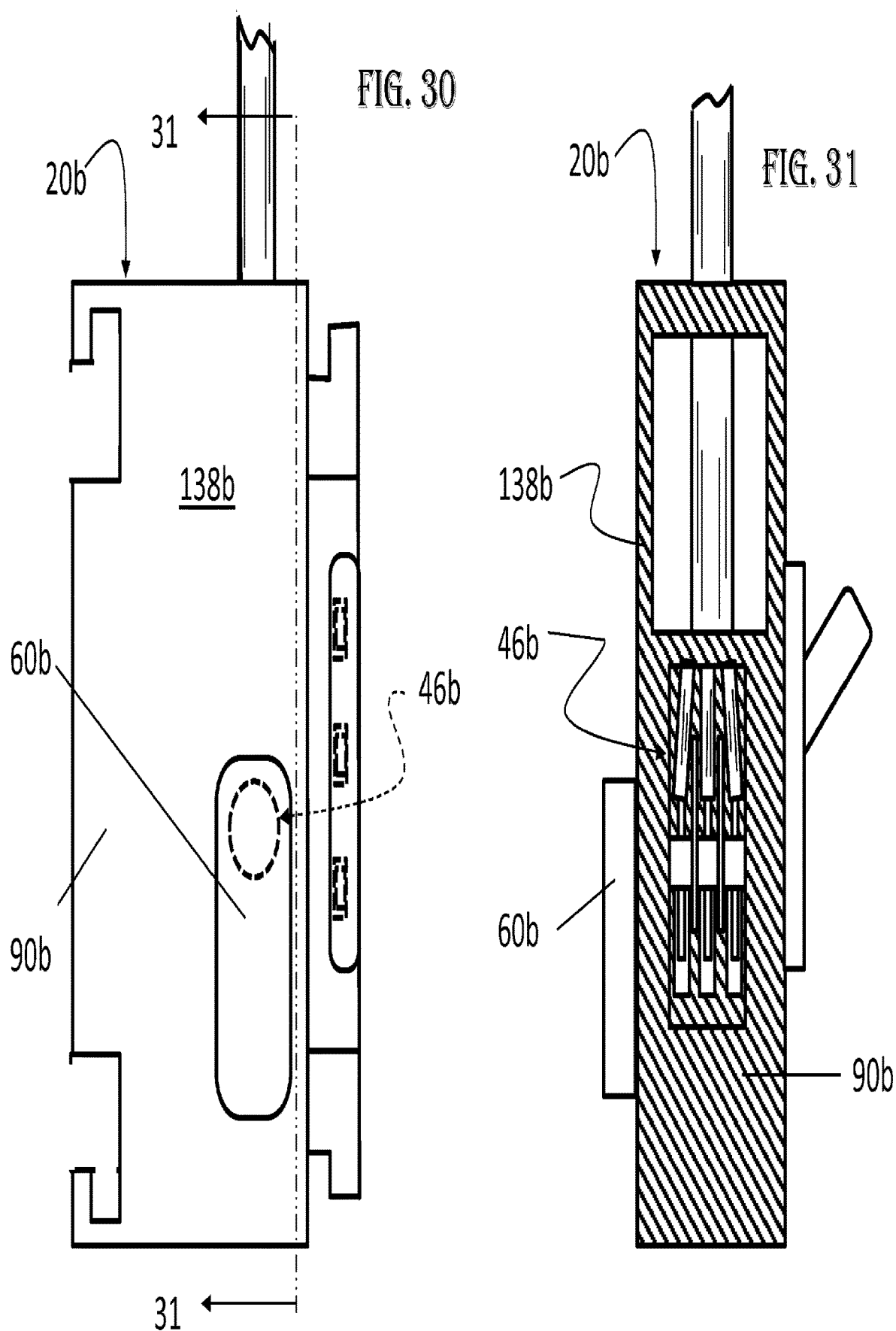

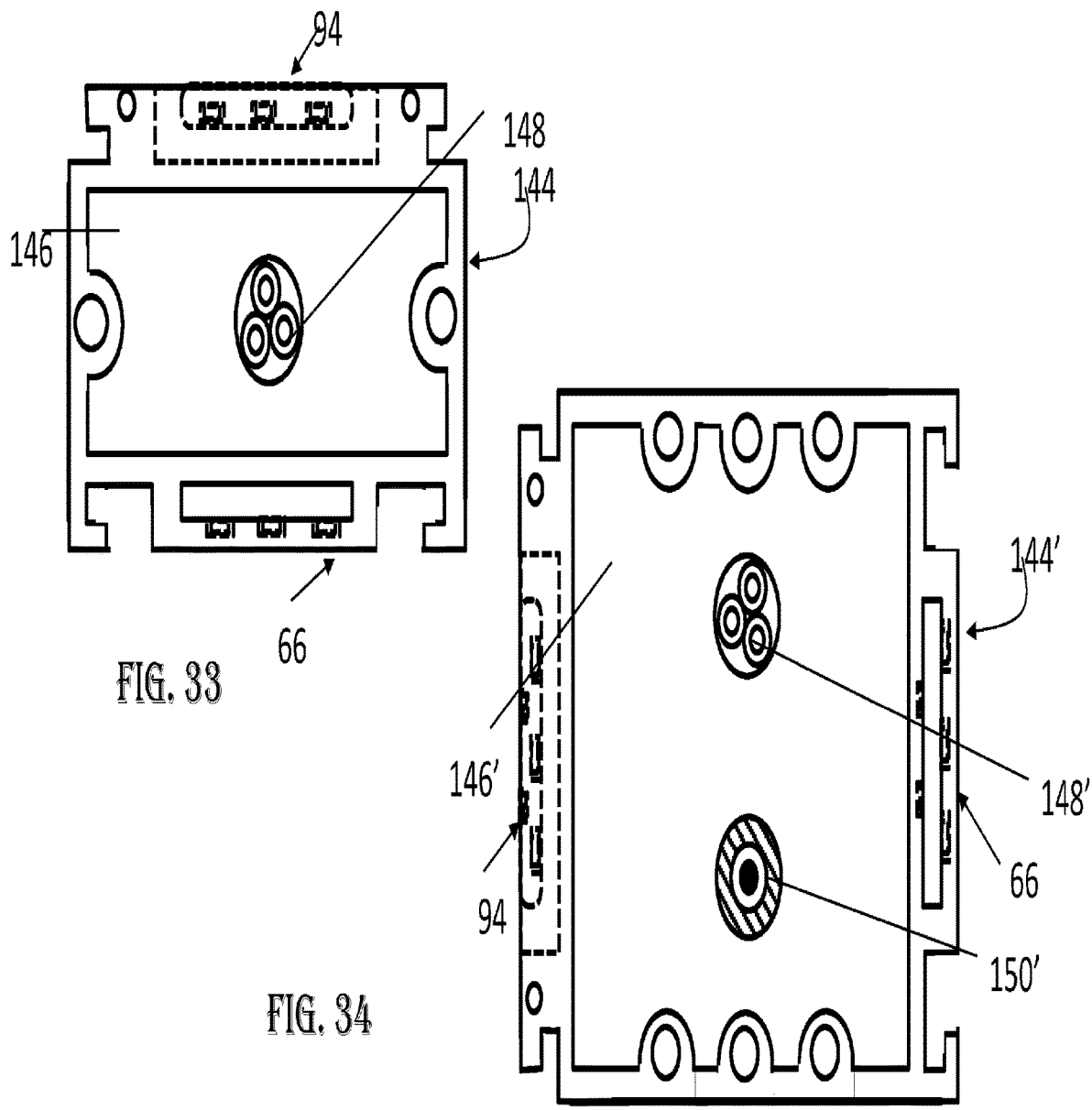

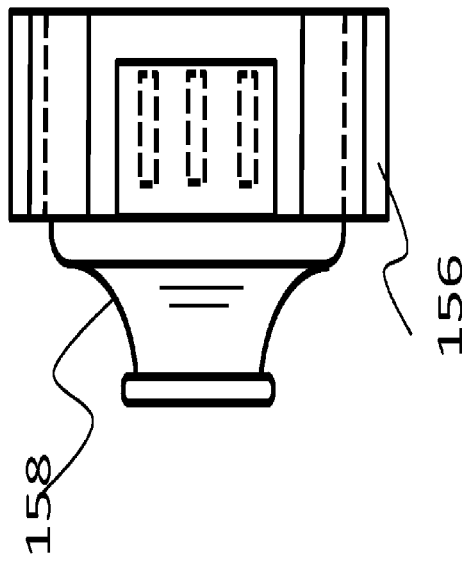
FIG. 36
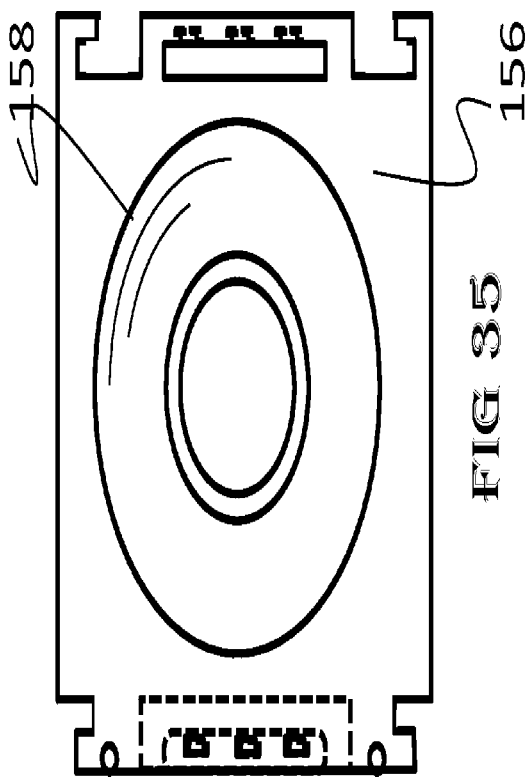
FIG 35
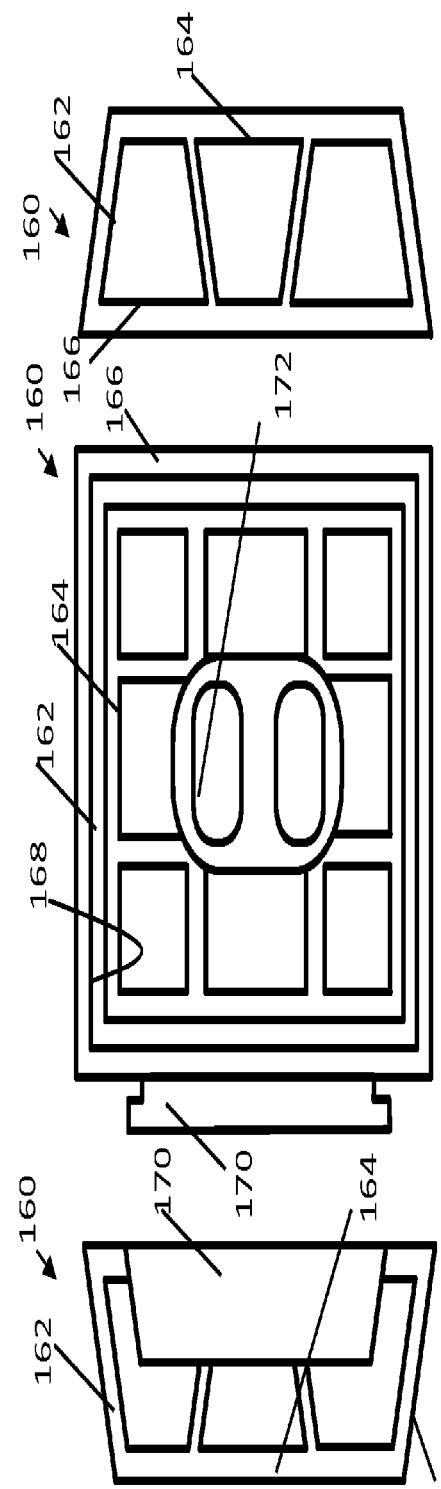
FIG 38
FIG 37
FIG 39

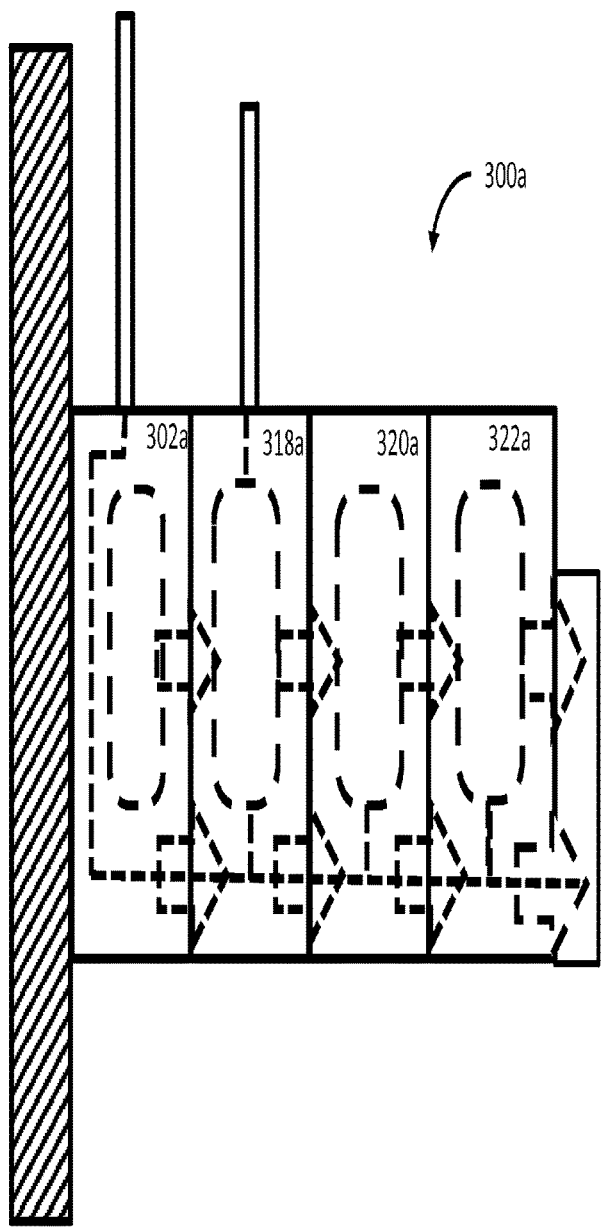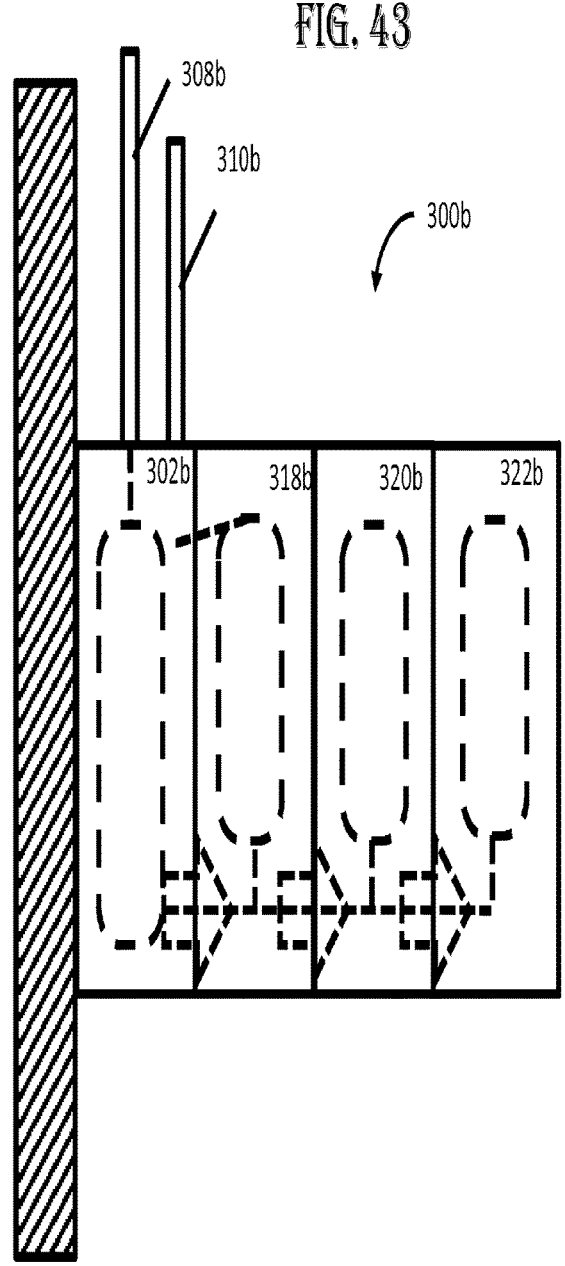

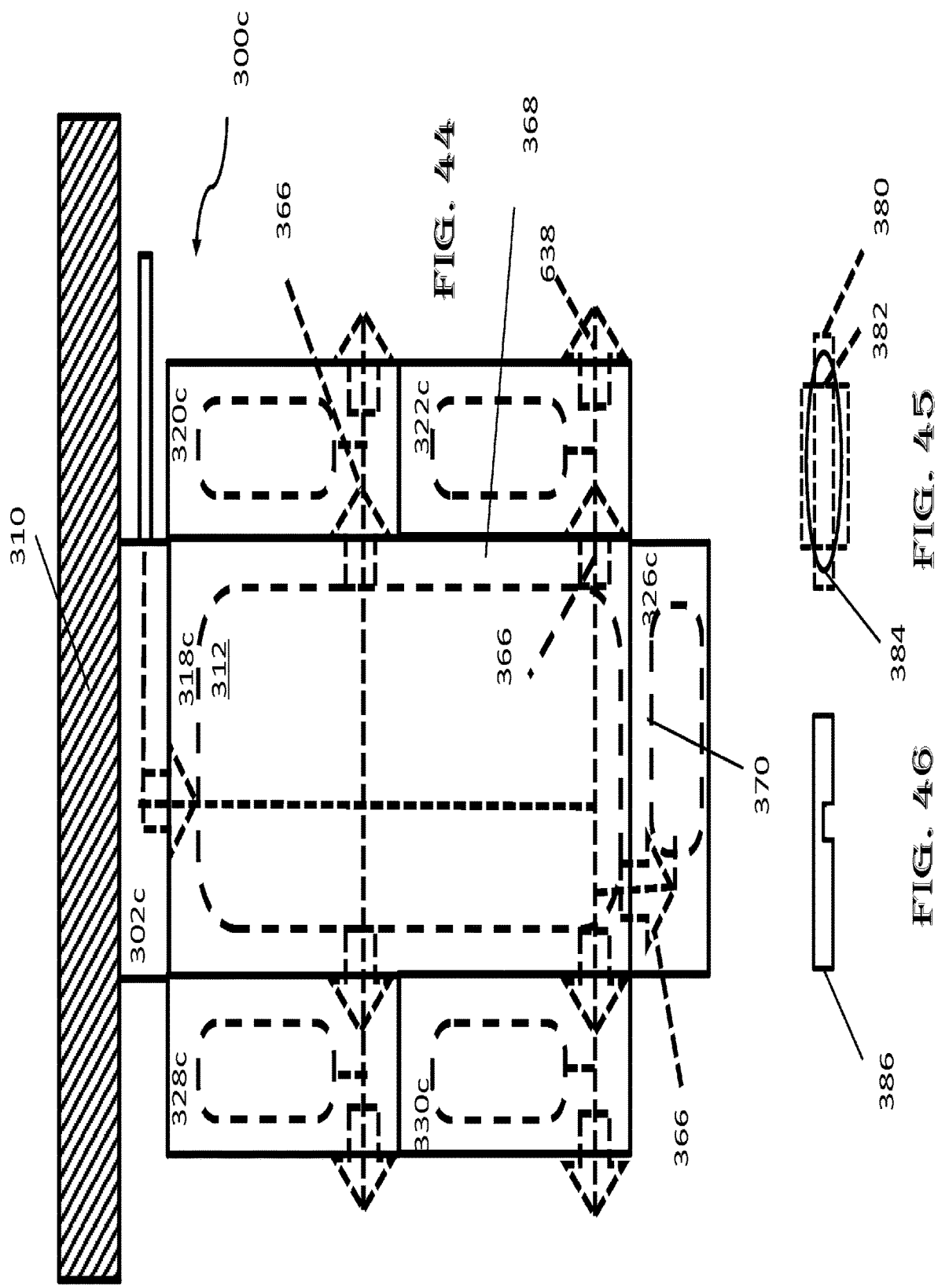

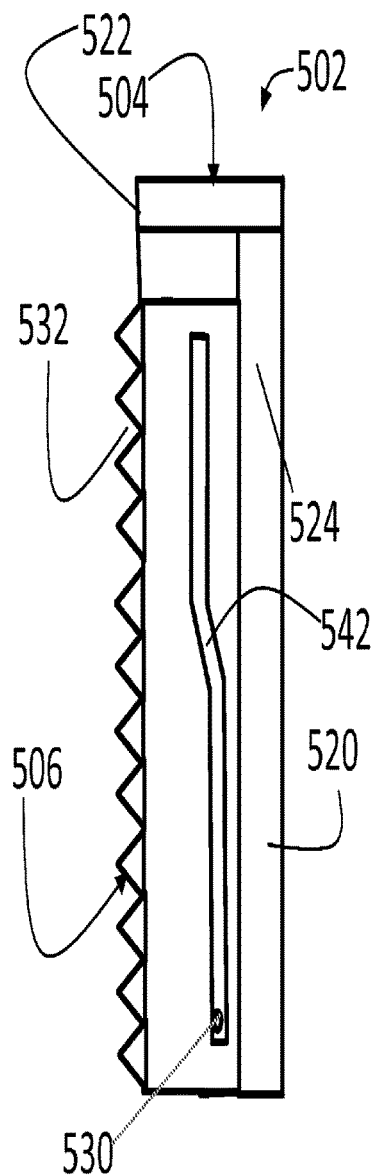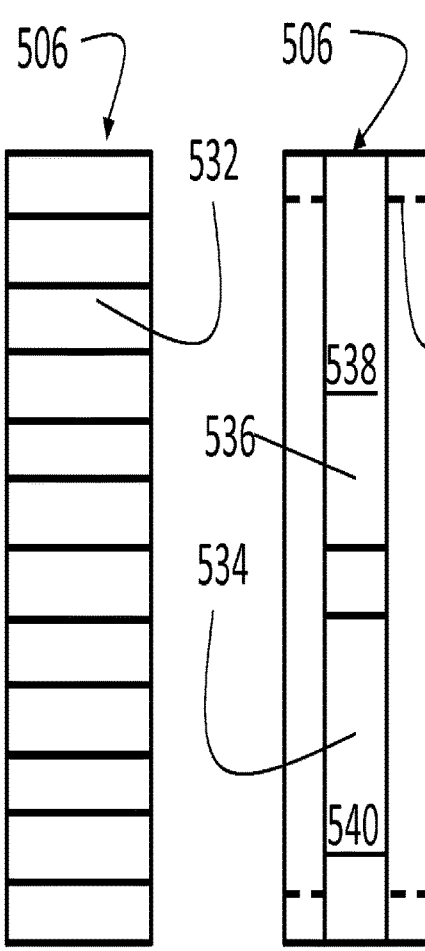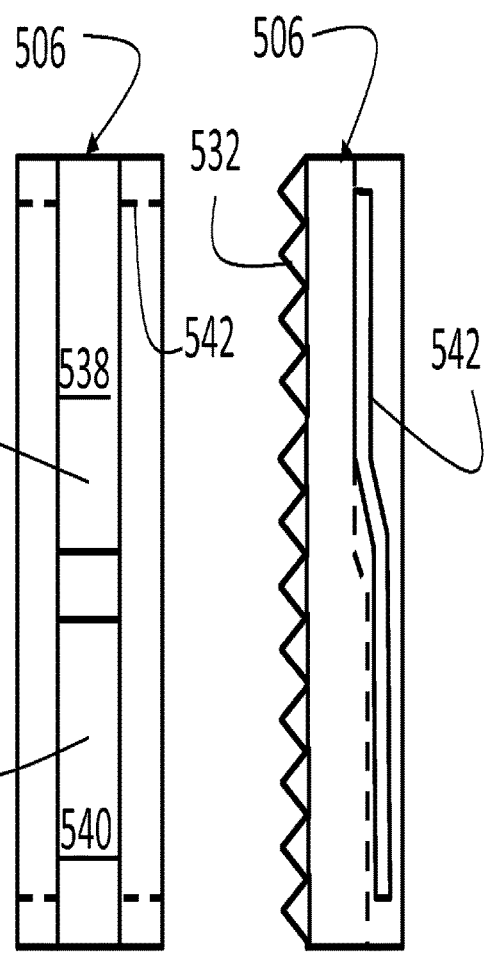
FIG. 56   FIG. 57   FIG. 58   FIG. 59

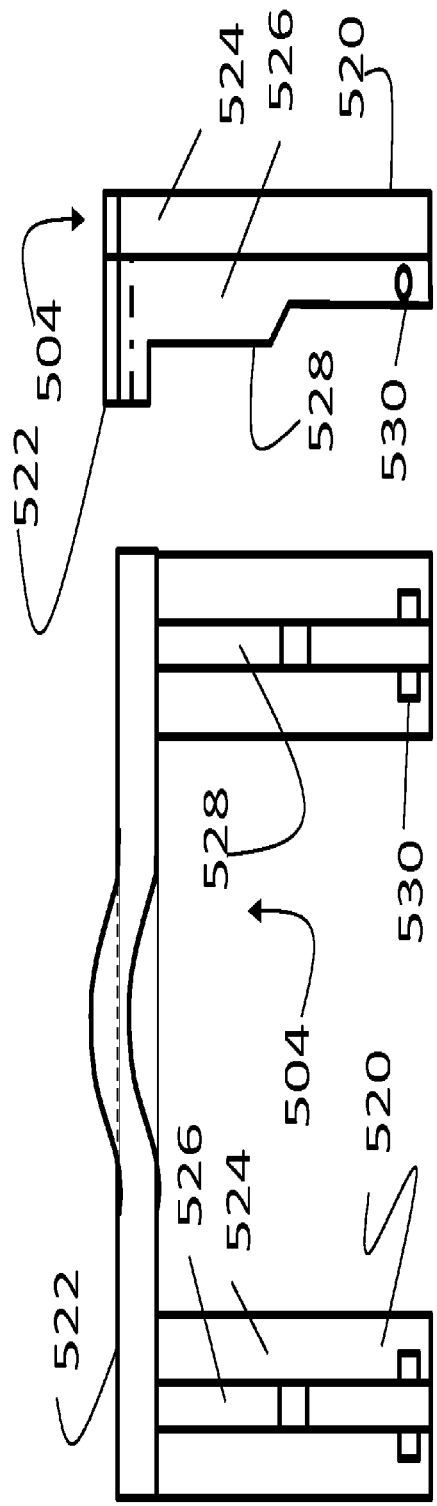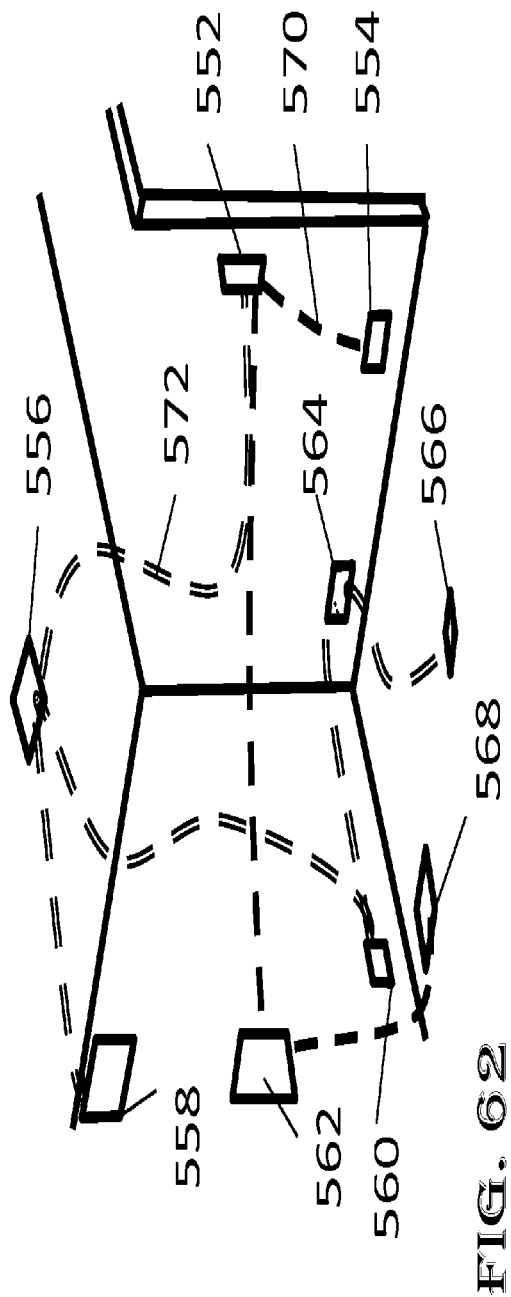

MODULAR ELECTRICAL WIRING SYSTEM AND METHODS THEREFOR

CROSS REFERENCE

This application claims priority from provisional application Ser. No. 61/644,426 filed on 5 May 2012 bearing the title Modular Electrical Wiring System and Methods Therefor and all disclosures are incorporated by reference herein.

TECHNICAL FIELD

This disclosure is related generally to fixed electrical wiring systems capable of interconnecting a plurality of electrical devices to a structural wiring system and more particularly to modular wiring systems and modular components thereof intended for installation at least partially behind structural surfaces.

BACKGROUND OF THE DISCLOSURE

Residential and light commercial wiring systems in the US and Canada include a myriad of 110/120 V and 240 V switches, outlets and functional devices that are typically manually wired together before being hidden behind wall structures such as drywall or paneling. When these components need to be updated or replaced, or when additional electrical devices are needed, they must again be manually wired into the structure's wiring system. This often results in postponing wiring system and component upgrades. It would be beneficial, then to have a modular system which facilitates less labor intensive installation of structural wiring components.

Other countries use other standards of voltage levels and types. Installing alternative standardized outlets, so that devices manufactured for these other standards may be used, is time consuming and expensive and may be restricted by building codes. New proposed standards for lower voltage wiring systems, such as so called "extra-low voltage systems" such as a 42 V system, and generational upgrades to installed wiring systems, such as adding grounding wires or data lines, are difficult to implement with existing wiring systems and components. A simpler system for installing such components would increase their beneficial use.

Similarly, other devices have been commercially available from time to which a consumer may wish to incorporate into a structural wiring system from time to time. These include smart power systems that regulate power in response to remote commands, peak power pricing, brown out conditions or other inputs as well as alarm system components, intercom or other communication components, and GFI devices. Such devices may have been more widely adopted if they could have been more readily integrated into a home wiring system.

Many devices, such as charging devices, fragrance dispensers, and night lights. which a consumer might prefer, given the choice, to have installed at least partially in a wall, are not because of the hassle of installing the device within the wall using current structural wiring systems. Instead, such devices are provided in boxes that take up space within the room and which are hung from an outlet. Still other devices, such as uninterrupted power supplies (UPS) and power line filters, are typically set on a floor or on furniture and electrically attached to an outlet by long power cords. They may be unsightly or unnecessarily take up space in a room and may attract the unfortunate attention of a toddler or a teething puppy.

Furthermore, many of these and other common freestanding devices will become more compact, lightweight, smarter, and less permanent in the future. While much less obtrusive, there are still many such devices which a homeowner or business owner will want to use in only one spot, at least for an extended period of time, and would prefer to at least semi-permanently attach to a building and/or hide at least partially hide behind a wall, ceiling or floor or within a counter, a shelf, or a door. Whether the reason for doing so is or space savings, safety, aesthetics or to dependably keep the device in a specific location, it would be useful to have a wiring system which facilitates the semi-permanent installation of such devices to a structure when and where needed.

Despite the ongoing convergence of electronic and data technologies, structural power wiring has continued to use basically the same standards and components as were first introduced the 19th century. Over the last hundred or so years, it has been upgraded in some ways by making the wiring, insulation and built in electrical devices out of newer and safer materials adding grounding wiring, and putting more functionality into the electrical devices, but otherwise the infrastructure is unchanged. This inertia is in great part due to the fact that, while electrical and material technologies may changing at an ever increasing rate, the structures that use power wiring have a significantly longer life than most of the electrical devices that use that power and therefore new electrical devices continue to made to conform to the wiring system in existing structures built decades ago.

The data environment within homes and offices has meanwhile evolved independently of the structural power wiring, Through the use of portable devices, the installation of separate systems of data and low power wiring such as Ethernet and cable wiring, and the use of wife networks and other forms of wired and wireless communication, a new tech data ecosystem has been created. Thus, modern structures may have an essentially 19th century power system while having a twenty first century cloud of data management.

It would be beneficial to have an improved power wiring system compatible with existing power wiring infrastructure but which can take advantage of this high tech data ecosystem and be flexible enough to accommodate new generations of electrical devices for long into the future.

A modular wiring system is disclosed herein having a base modular unit for mechanical connection to a stud or other structural element of a building and electrical interconnection with a source of power from a new or existing structural wiring system. The base unit further may have a power supply connector for rapid mechanical and electrical connection to one or more functional devices. The base unit has a power line connector for interconnection with a power line leading to a source of power such as circuit breaker panel. Wires are provided within the modular base unit to deliver power from the power line connector to the power supply modular connector. The exemplary base modular unit shown in FIG. 1 directly delivers the power from the power line to the power supply connector.

The modular system further may include a plurality of dependent modular units comprising functional devices. Each dependent modular unit incorporates an electrical device and a dependent connector interconnectable with a power supply connector to provide mechanical support for the dependent modular unit and electrical power for the electrical device. Each dependent modular unit may further be provided with a power supply connector to provide power to another dependent modular unit.

The inlets and outlets may also include connection features for communicating data as well as electrical power between a base unit and a functional device or between functional devices. The data may be phone, video, audio, internet, intercom, control data communicated between 2 adjacent functional devices, or wiring system control or safety data.

The electrical power may be in any form needed by the functional devices, such as 12 V DC, 120 V AC, and 240 VAC. The system may include multiple base units and functional devices available for different power standards, with a different mechanical connection features assigned to different power standards such as to allow compatible units to be interchangeable while inhibiting inadvertent interconnection of components of incompatible power standards. The system may also include functional units, called power adapters, adapted to input one power standard, convert the power and output a second standard of power The modular system disclosed herein offers a modular alternative that provides for more rapidly and safely installing, upgrading or retrofitting such devices by providing a modular system. It further provides a safe and quick way to alter the type of electrical surface from 220 to 120 V, from US standard voltages to European or other standards, or from standard outlets to GFI outlets. The system and components of the present invention are nonetheless compatible with legacy devices currently installed or available for installation.

The modular system described herein permits rapid modification of structural wiring components to new standards as they become available, such as extra low voltage, or ready usage of internationally available devices. It also simplifies installing behind the wall chargers for portable devices, such as a 12V DC chargers for in car devices or proprietary chargers for cell phones, and swapping out such chargers as new portable devices replace older devices.

SUMMARY OF THE DISCLOSURE

A modular electrical wiring system and components thereof, for connecting a plurality of electrical devices to structural wiring is disclosed herein.

The modular electrical wiring system may have a plurality of modular units, each provided with a connector capable of mechanically and electrically interconnecting the modular with another modular unit.

At least one modular unit may be a base modular unit having a main body, line connectors associated with the main body for mechanical and electrical interconnection with a power line of a structural power system, power supply connector associated with the main body for mechanical and electrical interconnection with a dependent connector of another modular unit and wiring electrically interconnecting the line connector and the power supply connector.

At least one other modular unit may be a dependent modular unit having a main body, an electrical device associated with the main body which may utilize electrical power provided by a structural power system, a dependent connector associated with the main body for mechanical and electrical interconnection with a power supply connector of another modular unit and wiring electrically interconnecting the dependent connector and the electrical device.

A base unit may also include an electrical device interconnected with the line connector. The electrical device may be a device to monitor the power used by dependent units interconnected to the base unit, a device to modify the power received by the power line to an alternate form of power to be supplied to the power supply connector, a device operating independently of the dependent modular units, or any other type of device which may beneficially use power provided by the power line.

A dependent modular unit may include a power supply connector for providing power to another dependent modular unit. Wiring may be provided between the dependent connector and the power supply connector of a first dependent modular unit to deliver power to the electrical device of a second dependent modular unit in electrical parallel with the power supplied to the electrical device of the first dependent modular unit. Alternatively, wiring may be provided to connect an output of an electrical device in the first dependent modular unit with its power supply connector so as deliver power to the second dependent modular unit that is controlled, modified or monitored by the electrical device in the first modular unit. Alternatively, a switchable base or dependent modular device may be provided with a selector switch that can effectively allow a selection between placing downstream dependent modular devices in electrical series or electrical parallel with the electrical device in the switchable modular device.

In a further embodiment, a base unit may include a mounting feature for mounting to a structure, a plurality of contacts, a power line connector for securing each of the wires of a power line to a respective electrical contact, the power supply connector being electrically interconnected with the contacts.

The electrical device of a modular unit may include one or more outlet or other power delivery device. An electrical device may alternatively or additionally include one or more switch, rheostat, thermostat or other power controlling device. An electrical device may alternatively or additionally include one or more power converter, inverter, adapter, filter or other type of power regulating device. An electrical device may alternatively or additionally include one or more safety and security, health and wellness, home automation, gaming, dispensing, information, processing, controlling, communication, illumination, environmental, sensing, educational or entertainment device.

Alternative exemplary electrical devices associated with modular units may include two way switches, three way switches, standard power outlets, switched outlets, GFT outlets, radio receivers, radio transmitters, wifi repeaters, cell phone signal boosters/repeaters, analog data processors, data storage devices, digital data processors, data capture devices, speakers, microphones, cameras, video displays, power storage devices, power line filters, rectifiers, inverters, voltage converters, AC to DC converters, DC to AC converters, chemical sensors, powder dispenser. sound sensors, motion sensors, light sensors, humidity sensors, smoke detectors, carbon monoxide sensors, temperature sensors, chemical dispensers, heaters, coolers, air movers, motor speed controllers, humidifiers, dehumidifiers, device holders, night lights, lasers, power line connectors, digital data connectors, analog data connectors, device holders, scanners, readers, and other types of devices.

A modular wiring system may comprise a first and a second main body each having a longitudinal direction along which they are moved relatively for engagement, respective elongated engagement configurations on each of the main bodies adapted for mutual mechanical and electrical interconnection, the elongated engagement configurations being elongated in the longitudinal direction. A plurality of electrical contacts elongated in the longitudinal direction may be disposed on each of the engagement configurations of the first and second main bodies.

A longitudinal track on one the main bodies and a longitudinal track follower on the other of the main bodies may be provided for guiding the mechanical interconnection of the main bodies in a manner to align the respective contacts for engagement when the respective engagement configurations are advanced into engagement such that the respective contacts are aligned and engaged along a range of relative positions of the first and second main bodies. A locking mechanism may be provided for interlocking the main bodies against relative movement at any selected relative position in the range of relative positions.

A converter modular unit for interconnecting a standard structural electrical component with a modular unit of a modular wiring system may comprise a modular frame adapted to accept the standard structural electrical component, the modular frame having the mechanical mounting features required for the standard electrical component. The converter modular unit may include a dependent connector for mechanically and electrically interconnecting the modular frame with a power supply connector of a base unit or dependent modular unit. A plurality of wires may be disposed within the modular frame, each wire being connected at one end to the dependent connector and connectable at another end to appropriate contacts of the standard electrical component for delivering power from the dependent connector to the standard electrical component.

A wiring connector for rapid wiring connector for connecting a power line having a plurality of wires to a plurality of electrical contacts associated with modular unit may comprise a cam shaft, a lever for rotatably driving the cam shaft and a plurality of cams mounted to the cam shaft, each rotatable with the cam shaft to drive a respective one of the wires into engagement with a respective one of the electrical contacts.

Alternatively, a wiring connector may comprise a plurality of electrically conductive rotatable shafts, each connected to one of the contacts and each having a feature engageable with of one of the wires of the power line, such as a passageway for passage therethrough of a wire. Each wire may be mechanically secured to its respective electrically conductive rotatable shaft by rotation of the shaft.

A modular unit may comprise at least one electrical device; a male dependent connector for mechanically and electrically interconnecting the modular unit with a female power supply connector; a first plurality of wires disposed in the modular unit, each connected at one end to a contact on the dependent connector and at another end to a contact on the electrical device for delivering power from the dependent connector to the electrical device; and a second plurality of wires disposed in the modular unit, each connected at one end to a contact on the power supply connector and at another end to a contact on the electrical device or on the dependent connector for delivering power to the power supply connector from the electrical device or from the dependent connector.

A dependent modular unit may be provided with a power line connector to interconnect an output of the electrical device of the dependent modular connector with the wires of a power line leading to another electrical device, such as a light fixture.

One or more electrical devices may be adapted to communicate analog or digital data using a power line carrier. Alternatively, the electrical devices may communicate data wirelessly using wifi, bluetooth or any other suitable standard. Alternatively, the electrical devices may communicate with each other using one or more data line incorporated into their respective power line or supply connectors.

The modular units may be designed to be assembled in a train of sequential modular units extending along a first axis by being rapidly interconnectable with adjacent modular units by relative movement between their respective connection features in a direction perpendicular to the first axis.

The wiring system may include a terminal cap having a main body and a plug emulating the shape of a dependent connector and adapted to removably interconnect with a power supply connector to close the power supply connector;

A modular unit may comprise a converter for interconnecting a standard structural electrical component with a modular base unit of a modular wiring system comprising a modular frame adapted to accept the standard structural electrical component, the modular frame having the mechanical mounting features required for the standard electrical component; a dependent connector for mechanically and electrically interconnecting the modular frame with a base unit; and a plurality of wires disposed in the modular frame, each connected at one end to the dependent connector and connectable at another end to the standard electrical component for delivering power from the dependent connector to the standard electrical component.

The wiring system may further include a template for simulating the footprint of one or more future electrical devices intended to be installed to the installed connector and for guiding the cutting of an aperture through structural surface materials for later installation of electrical devices. The template may comprise a frame emulating the external footprint of a modular electrical component, and at least one a connector emulator depending from the frame and emulating the shape of an electrical connector such that the template may be temporally positioned by way of connecting the emulated connector to an installed connector. The template may further comprise a plurality of finger openings in the frame adapted to be accessible by human fingers for squeezing portions of the frame together to permit removal of the template through the aperture. Alternatively, the template may incorporated into a modular component and severed and disposed, if desired, after the aperture is cut.

A modular unit may have multiple electrical devices, power supply connectors, power line connectors, and/or dependent connectors.

The electrical wiring system may include modular units having different standardized types of connectors wherein each type of connector is associated with a standard of power or data communicated by the connector. A standard type of connector may include connectors, for example, for varying voltage levels such as 12V, 42V, 120 V. 120 V, 220V, 230 V and 240 V varying voltage types such as AC or DC. A standard type of connector may include connectors, for example, for carrying data, including, for example, analog audio or video, digital audio or video, Ethernet type data, or data encoded on a radio carrier wave.

Standard connectors may be configured to inhibit accidental interconnection of modular units intended for one standard of power and/or data with modular units intended for an incompatible standard of power and/or data. The configurations may differ in the shape of the connector and/or the track, the location of contacts on the connectors.

A structure may be wired for later installation of modular electrical units by installing wiring from a central location to a distributed location, installing a base modular unit to the wiring and to a structural element at the distributed location. installing a template to the base modular unit, installing a wall surface over the base modular unit and template, cutting an aperture in the wall surface using the template as a guide for the cutting operation, removing the template through the aperture, passing a dependent modular unit through the aperture, installing the dependent modular unit to the base modular unit and adjusting the position of the dependent modular unit relative to the base modular unit.

The modular wiring system allows unification of all low power wiring systems for a structure into a single wiring infrastructure. This could include such user systems as safety and security, intercom, power management, infotainment, remote control, gaming, health and wellness, and environmental comfort systems. Thus a structure can be wired with a single interoperable system of wiring using distributed base modular units instead of requiring separate wiring systems for each of these user systems. This eliminates need for multiple sets of wiring and multiple power supplies. This infrastructure could be a low voltage wiring infrastructure, a standard voltage infrastructure, or, a combined low and standard voltage infrastructure.

BRIEF DESCRIPTION OF THE DRAWINGS

Some configurations of the energy management system will now be described, by way of example only and without disclaimer of other configurations, with reference to the accompanying drawings, in which:

FIG. 1 is a front elevational view of a prior art structural electrical wiring system having two 120 V AC outlets and a 120 V AC power switch installed in a wiring housing which is mounted to a stud in a wall.

FIG. 2 is a front elevational view of an exemplary modular assembly having a 120 V AC base modular unit and a train of three sequentially connected modular units having as their electronic devices, respectively, a power switch and two double electrical outlets.

FIG. 3 is a top plan view of the modular assembly of FIG. 2, showing a cutaway through the wall and an outlet plate.

FIGS. 4A and 5A are a front and side elevational views, respectively, of an alterneative base modular unit similar to that of FIG. 4 and 5 but incorporating a template for cutting an aperaure in a wall or ceiling surface.

FIG. 14 is a front elevational view, with some internal components shown in dashed line, of a first dependent modular unit of FIGS. 2 and 3 showing the electrical device, in this case a duplex electrical outlet, thereof as well as the power supply connector, and the dependent power connector thereof.

FIGS. 15 and 16 are opposing side elevational views of the dependent modular unit of FIG. 14.

FIG. 17 is a rear elevational view of the dependent modular unit of FIGS. 14-16.

FIG. 18 is a bottom plan view of the dependent modular unit of FIGS. 14-17.

FIG. 19 is a sectional view, with parts removed of the dependent modular unit of FIGS. 14-17 taken along line 19-19 of FIG. 14.

FIGS. 20 and 21 are, respectively, a top plan view and a front elevational view of an eccentric fastener for interconnecting the power supply connector of the base modular unit of FIGS. 4-7 with a dependent power connector of the dependent modular unit of FIGS. 14-19.

FIG. 22 are partial enlarged top plan views of the dependent power connector of the dependent modular unit of FIGS. 14-17 interconnected with the power supply connector of the base modular unit of FIGS. 4-7 and showing the eccentric fastener of FIGS. 20 and 21, in an unlocked orientation.

FIG. 23 are partial enlarged top plan views of the dependent power connector of the dependent modular unit of FIGS. 14-17 interconnected with the power supply connector of the base modular unit of FIGS. 4-7 and showing the eccentric fastener of FIGS. 20 and 21, in a locked orientation.

FIGS. 24, 25 and 26 arc, respectively, a top plan view and two side elevational views of an alternative eccentric fastener.

FIG. 27 is a front elevational view of the second dependent modular unit of FIGS. 2 and 3 showing the electrical device, in this case a single pole, single throw electrical switch thereof, as well as the power supply connector, and the dependent power connector thereof.

FIG. 28 is a rear elevational view of the second dependent modular unit of FIG. 27 illustrating the power line connector for connecting the switch to a controlled line leading to a controlled device, such as a light.

FIG. 29 is a side elevational view of the dependent modular unit of FIGS. 27 and 28 showing, in schematic form, certain features of the power line connector thereof.

FIG. 30 is a real elevational view of a dependent modular unit similar the dependent modular unit of FIGS. 27-29 but having an alternative orientation of the power line connector.

FIG. 31 is a sectional view of the dependent modular unit taken along line 31-31 of FIG. 30.

FIG. 32 is a real elevational view of a dependent modular unit similar the dependent modular units of FIGS. 27-31 but having an alternative type of power line connector.

FIGS. 33 and 34 are front elevational views of alternative modular adapters for installing conventional electrical devices into the modular assembly of FIGS. 2-3.

FIGS. 35 and 36 are, respectively, front and side elevational views of a dependent modular unit having as its electrical device a light fixture for a conventional light bulb.

FIG. 37 is a front elevational view of a removable template for preparing a wall surface for installation of dependent modular adapters.

FIGS. 38-39 are opposing side elevational views of the removable template of FIG. 37.

FIGS. 42 and 43 are schematic view similar to FIG. 39, but illustrating alternative generalized exemplary modular assemblies according to the present invention having a modular base unit incorporating an electronic device communicating power and data attached to a train of three sequentially connected exemplary modular units, each having an exemplary electronic device communicating electrical power and data.

FIG. 44 is a schematic view similar to FIGS. 41-43 but illustrating still another alternative generalized exemplary modular assembly according to the present invention having a generic modular base unit, a first modular unit connected to the base and incorporating a electric device comprising a touch screen computer; and a plurality of modular units each incorporating electrical devices connected to the first modular unit and communicating electrical power and data with the first electronic device.

FIGS. 45 and 46 are schematic views illustrating alternate shapes for receptacles and tongues for power connectors.

FIG. 56 is a side elevational view of an alternate module interlocking system for use with the alternate dependent modular unit of FIGS. 54-55.

FIGS. 57-59 are front, back and side elevational views, respectively, of an engagement tread of the alternate module interlocking system of FIG. 56.

FIGS. 60 and 61 are a front and side elevational view of a handle of the alternate module interlocking system of FIG. 56.

FIG. 62 is a schematic perspective view of a room illustrating alternative installations of modular units of FIGS. 1-61.

DETAILED DESCRIPTION OF THE DRAWINGS

Figure 4:
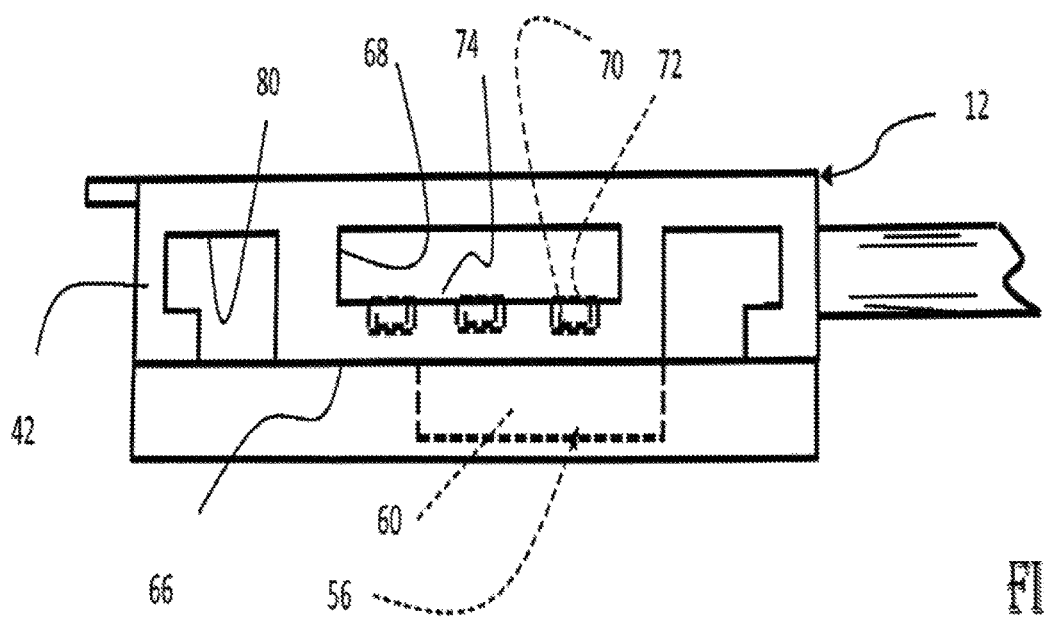
FIG. 4 is a front elevational view of the base modular unit of FIGS. 2 and 3 showing details of the power supply connector thereof.

The present invention provides a modular structural wiring system and components therefor. The modular system includes a plurality of modular units incorporating an electrical connection system for rapid and reliable electrical and mechanical interconnection of the modular units. In particular, the system is designed so that a plurality of units may be arrayed in a line or a plane parallel with and behind a structural surface and interconnected with each other by the relative movement of the electrical interconnection components in a direction generally perpendicular to such line or plane. The many details, features, advantages of the present invention will become apparent from the below description of the exemplary system and components shown in the attached drawings.

As used herein, the term structure means a fixed, temporary, portable or mobile construction that requires a power wiring infrastructure. A fixed structure means a structure, which is permanently attached to ground in a generally fixed location, such as a residential or commercial building, a fence or other fixed outdoor construction such as a permanent outdoor stage. A temporary or portable structure is a similar structure that is movable from one location to another and which may be partially disassembled and re-assembled between locations. A mobile structure is a structure that may be used while in motion, such as a vehicle. Structural wiring is wiring that is installed permanently to a structure to form an infrastructure for dispersed availability of power at various locations of the structure and a structural wiring system is the structural wiring plus electrical devices that are installed to the structure a permanent or semi-permanent basis.

As used herein, low voltage generally means standard residential outlet voltage levels such as 110\120 V, medium voltage means higher residential voltages such as 220/240 V used for large appliances, high voltage shall mean voltages above that, and extra low voltage means voltages of 42 V or lower. It should be noted that 42 V systems were originally proposed for automotive uses but also were considered for certain residential use where it was desirable to have power, but it was desirable to have a lower shock risk to the user. This standard was never adopted in part because of the expense and complexity of adding a second power wiring system, particularly to an existing structure for the purpose of merely substituting for standard outlets. However, such a standard may become more desirable as more electrical devices become available that do not require the higher energy levels delivered by 120 V.

Referring now to the drawings generally, wherein like reference numerals are used for like components, exemplary electrical wiring systems are shown in detail. Although the drawings represent alternative configurations of electrical systems, the drawings are not necessarily to scale and certain features may be exaggerated to provide a better illustration and explanation of a configuration. The configurations set forth herein arc not intended to be exhaustive or to otherwise limit the device to the precise forms disclosed in the following detailed description. For example, features shown in various embodiments may be mixed and combined with features shown in other embodiments. As shown in the drawings, a short dashed line is often used to schematically represent a power or data supply line which may use any numbers of wires, such as a hot, a neutral and a ground wire. Short dashed shape lines are also used for hidden components A long dashed line is sometimes used to schematically represent a single wire. Dash-dot lines are used for centerlines.

FIG. 1 illustrates a wiring system 2 of the prior art using an electrical box 3 connected to a stud 4. The electrical box 3 is adapted for the installation therein of one or more electrical devices 5 and 6. In the example illustrated, a light switch 5 and two duplex outlets 6 are installed in the electrical box 3. A first power line 7 delivers power to the electrical box 3 through apertures in walls of the electrical box. A second power line 8 selectively delivers power from the light switch to a light fixture, not shown. A switch plate, not shown, is generally attached to the electrical devices 5 and 6 to cover an installation and access aperture through a wall surface, such as drywall, plaster or paneling, also not shown. Similar systems using boxes and electrical devices are used for mounting electrical fixtures to ceilings.

The standard components of the prior art wiring system 2 of FIG. 1 are generally made to conform to a standard footprint in that there are standard dimensions for the height, width and depth of the electrical devices, standard locations for the apertures for screws to fasten the electrical devices to an electrical box, standard locations for threaded bores accepting screws for attaching cover plates, and standard shapes and apertures in electrical plates through which portions of the electrical devices pass or are accessible. These apertures, for example, include apertures for single or multiple switches, duplex outlets, single or multiple cable or phone jack, and large rectangular apertures for paddle type switches.

Despite the ongoing convergence of electronic and data technologies, structural power wiring has continued to use basically the same components as were first introduced the 19th century, as shown in FIG. 1. This is in great part due to the fact that, while technologies available for structural power may changing at an ever increasing rate, many structures have a significantly longer life than the electrical devices installed in them and therefore there is much inertia acting to maintain the status quo. Meanwhile, the data environment within homes and offices has evolved independently of home wiring, Through the use of portable devices, Ethernet and cable wiring, (bypassing power wiring) wifi networks and other forms of wired and wireless communication a new tech ecosystem has been created These structures May use a local or remote cloud of data management which could be readily used by updated systems for power wiring.

Wireless portable devices may fulfill many needs which were originally fulfilled by built-in or fixed devices. However, there remains a need for built in devices for several purposes. Fixed local devices are required for power switching, even if the decision making is elsewhere, there is a need for power switching functionality in the power line. Other devices perform functions are best performed at a specific location, perhaps even a repeatable location. The best example of this is power sensing and power switching, which can be controlled from portable devices but need to be executed locally with the power lines being monitored or controlled. Similarly, ceiling and sconce lighting and ventilation is typically built in. Other examples requiring local execution are general environmental sensing and control, security and safety sensing, indoor GPS, and wifi and cellphone signal repeating. Some devices are preferably built in so that they never lose power and are never misplaced and are not as easily stolen. Still other devices need to be accessible to users who are not in the structure's network or who are w/o functioning portable devices.

FIGS. 2-37 and 40-61 show a modular system compatible with existing wiring infrastructure and today's wireless ecosystem which is flexible enough to accommodate new generations of devices for long into the future.

In particular, FIGS. 2 and 3 illustrate an exemplary modular wiring system 10 having a base modular unit 12 for mechanical connection to a stud 14 or other structural element of a building and electrical interconnection with a source of power from a new or existing structural wiring system, such as a power line 16 leading to a circuit breaker panel, not shown. The modular wiring system 10 includes a plurality of dependent modular units 20, 22 and 24 sequentially electrically and mechanically interconnected with each other and with the base modular unit 12 to form a series or train of modular units. Each of the modular units 12, 20, 22 and 24 incorporates at least one electrical device. In the example illustrated in FIGS. 2 and 3, the electrical devices include a power switch 26 and two duplex outlets 28 so that the modular wiring system 10 provides the same functionality as the prior art wiring system 2 of FIG. 1. The dependent modular unit 20 incorporating the power switch 26 is connected to a power line 30 leading to a light fixture, not shown. It will be appreciated that the power switch 26 may be a standard power switch, a three way switch, a dimmer switch or a timer or may incorporate an automated and/or environmentally responsive feature. As shown in FIG. 3, a conventional switch plate 32 may be attached to the dependent modular units 20, 22 and 24 to cover an installation and access aperture 34 through a wall surface 36.

The modular units and electrically and mechanically interconnected with each other by a modular connector system 38, shown only schematically in FIG. 2 and described hereinbelow in detail. A terminal cap 40, also described later, is provided to electrically close the last portion of the modular connector system.

It will be appreciated that each dependent modular unit 20, 22 and 24 illustrated in FIGS. 2 and 3 may be designed to generally agree with the standard footprint. In particular, when assembled, dependent modular unit 20, 22 and 24 or other modular units may take up approximately the same space in the wall as the as the electrical box 3 together with the outlets 6, switches 5 or other electrical devices of the prior art exemplified in FIG. 1. By generally conforming to the standard footprint, the wiring system 10 may be compatible with prior art switch plates 32. This may be done to further make it compatible with the design expectations of existing structural wiring systems. However, alternative modular units may be made conforming to new shapes and sizes, as warranted by future design and electronic device trends.

Each of the modular units 12, 20, 22 and 24 shown in the drawings is designed to be used without requiring an electrical box 3 like that shown in FIG. 1. Should an enclosure be desired for some installations or environments to thermally or electrically isolate modular units from the environment within a wall, an enclosure large enough to enclose all or portions of the desired train may be attached to a stud at the time that a base modular unit 12 is installed. Alternatively, an enclosure may be incorporated into a single component with the base modular unit 12. An enclosure may be especially desirable, for example, for modular units that incorporate electrical devices which communicate with, monitor or regulate aspects of home water or natural gas systems including devices measuring or regulating the temperature, quality or flow of water, or detecting the leakage of water or gas. It will be appreciated that, unlike electrical boxes 3 of FIG. 1, these enclosures would not be required to have the traditional mounting points used in the prior art for accepting screws for mounting the electrical devices to the enclosure.

Figure 5:
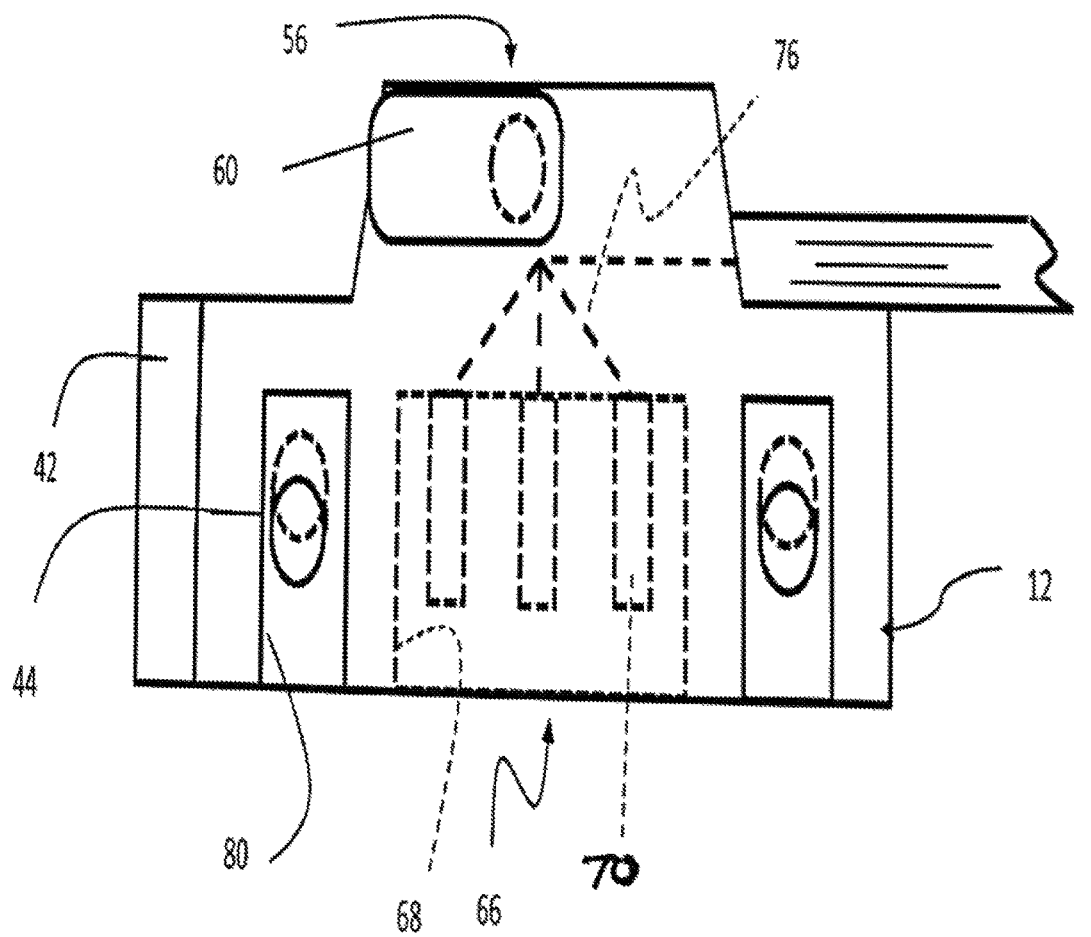
FIG. 5 is a side elevational view of the base modular unit of FIG. 4 showing, in schematic form, certain features of the power line connector thereof.
Figure 7:
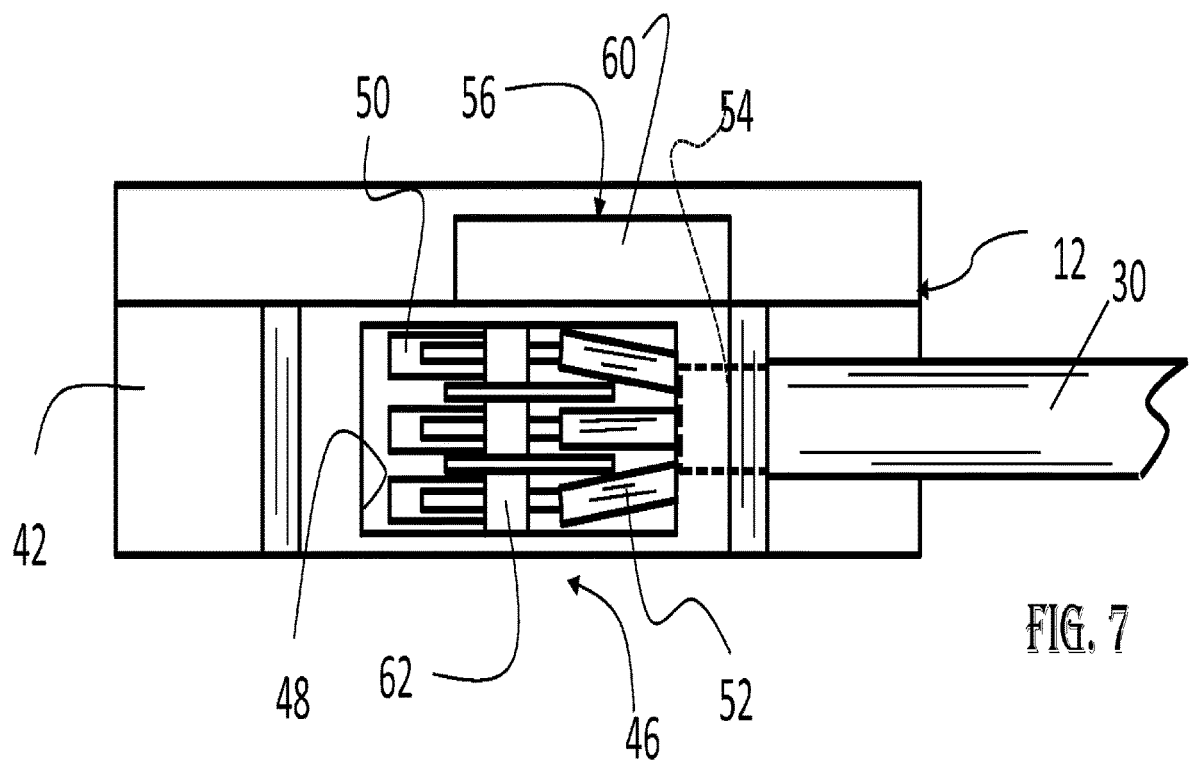
FIG. 7 is a rear elevational view of the base modular unit of 1FIGS. 4-6 showinf details of the power supply connector thereof.
Figure 6:
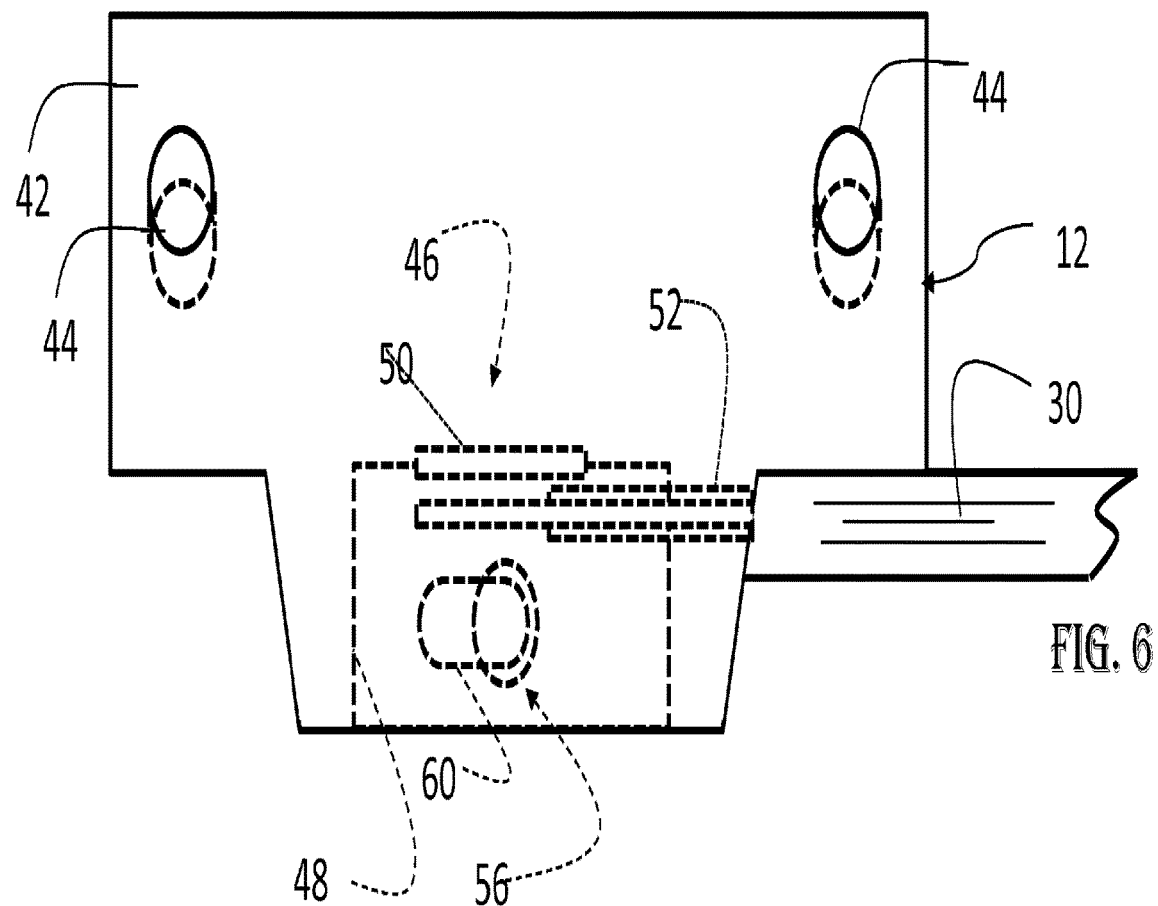
FIG. 6 is an opposite side plan view of the base moular unit of FIGS. 4 and 5 showing, in chematic form, certain fiatures of the power supply connector thereof.

Referring now to FIGS. 4-8 depicting certain details of the exemplary base modular unit 12 of FIGS. 2 and 3, the base modular unit 12 has a main body 42 through which are provided bores 44, shown only in FIGS. 5 and 6, for fasteners, not shown, such as screws or nails, not shown, for securing the base modular unit 12 to a stud, as generally depicted in FIGS. 2 and 3. The bores 44 may be angled for better access by tools during installation or removal. As shown in FIGS. 6 and 7, the base modular unit 12 further has a power line connector 46 disposed in a cavity 48 in the main body 42 for interconnection of a plurality of contacts 50 with a plurality of wires 52 of the power line 30. The power line 30 is inserted through a passageway 54 in the main body 42 into the cavity 48. The cavity 48 may be open, sealed, or accessible through a door, not shown. The power line connector 46 may be provided with a system, such as a cam shaft 56, for facilitating rapid locking of the wires 52 to the contacts 50.

Figure 7A:
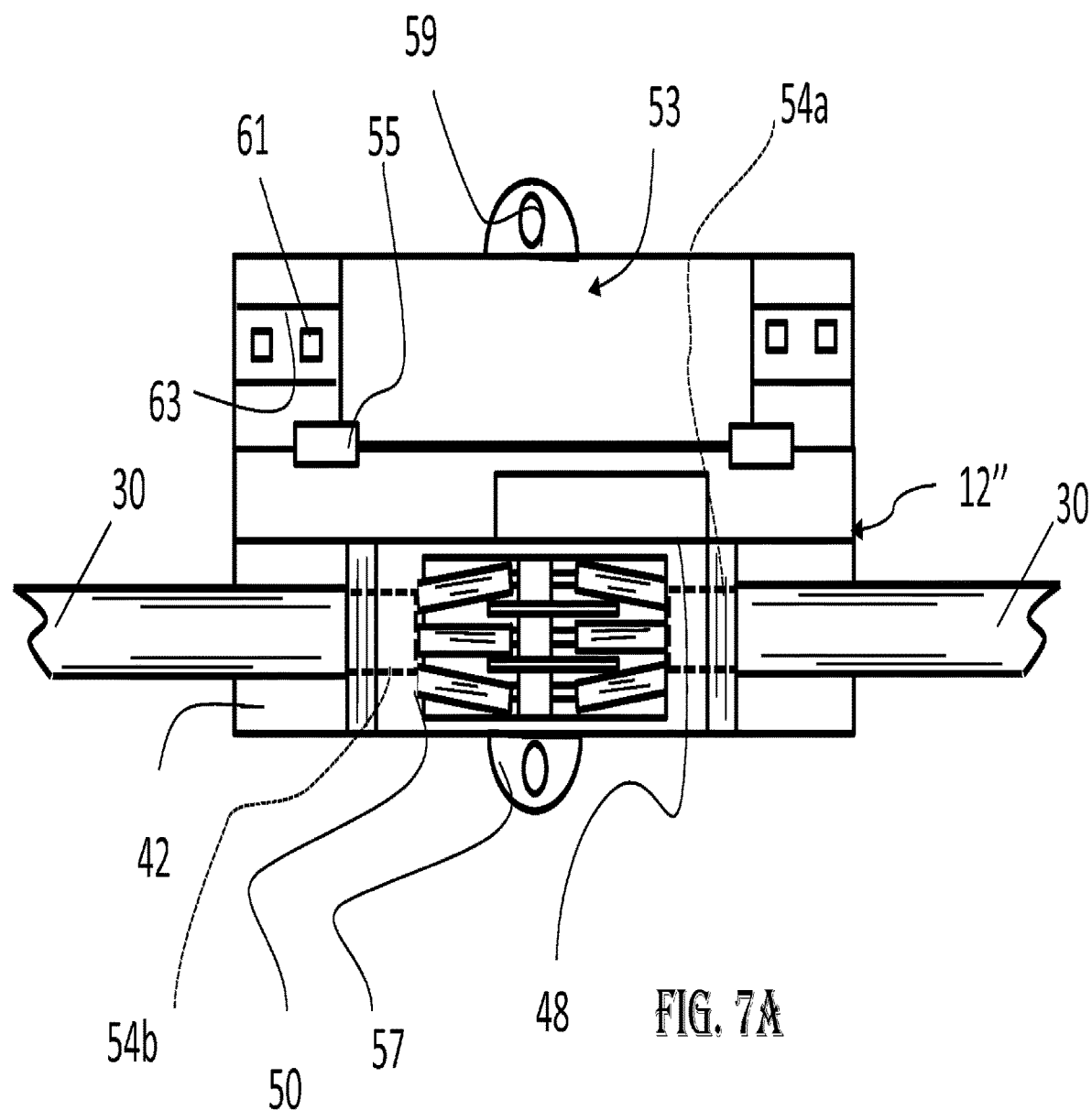
FIG. 7A is a rear elevational view of an alternative base modular unit similar to that of FIGS. 4-7 but incorporating a clam shell cover further shielding the wiring of the power supply connector thereof.

Referring now to FIG. 7A, illustrating an alternative base modular unit 12", the base modular unit may further provide for two power lines 30 for interconnection with plurality of contacts 50. The power lines 30 are inserted through passageways 54a and 54b in the main body 42 into the cavity 48. The cavity 48 may be accessible through a door, or clam shell 53 attached by hinges 55 to main body 42 and selectively secured in a closed position engaging interlocking bosses 57 and 59, depending, respectively, from the clam shell and the main body. Clam shell 53 may also provide strain relief abutments 61 incorporated into channels 63 engageable into power lines 30 when the clam shell is closed and latched.

Figure 8:
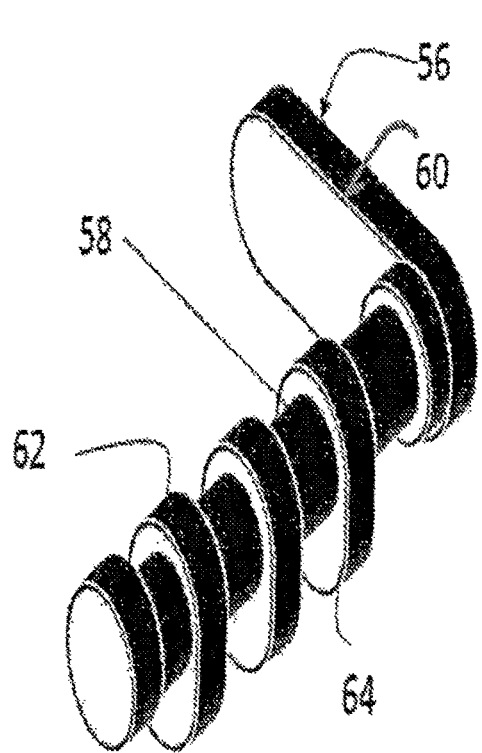
FIG. 8 is a perspective view of the cam shaft of the power line connector of the base modular unit of FIGS. 2-7.
Figure 9:
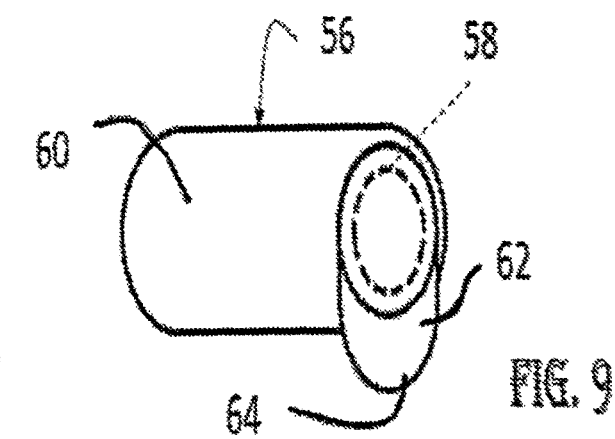
FIGS. 9 and 10 are, respectively, side and front elevational views of the cam shaft of FIG. 8.
Figure 10:
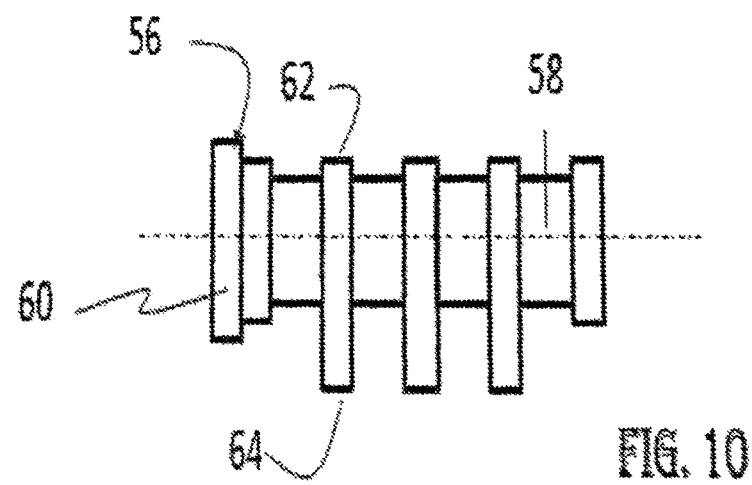

As best shown in FIGS. 8-10, the cam shaft 56 may consist of a shank 58 connected to a lever 60 and a plurality of cams 62, one cam corresponding to each of the wires 52 of FIGS. 6 and 7. The cams 62 each has a large diameter portion 64 aligned with the regions of the other cams. When a large diameter portion 64 of each cam 62 is in a first position remote from its respective contact, the wires 52 may be easily inserted into the connector past the cams 62, with one wire 52 overlying each contact 50. When the lever 60 is used to rotate the cam shaft 56 a predetermined angular amount, approximately one-quarter of a full turn in the example illustrated in FIGS. 8-10, the large diameter portion 64 of each cam engages a respective wire 52 and presses its respective wire 52 against its respective contact 50 to mechanically and electrically interconnect the wires 52 with the base modular unit 12.

Referring again to FIGS. 4 and 5, the base modular unit may also be provided with a power supply connector 66 which forms a portion of the modular power connector system 38 of FIG. 2. The power supply connector 66 includes a receptacle 68 for insertion of portion of a dependent connector, such as the tongue 96 of dependent power connector 94 of FIGS. 14 and 16-19 (described shortly herein and not shown in FIGS. 4-8) to provide power to the dependent connector 94. A plurality of spaced apart elongated electrical contacts 70 are each disposed in a respective recess 72 in an inner wall 74 of the receptacle 68. Each of the receptacle electrical contacts 70 are connected by wires 76 within the main body 42 of the modular base unit 12 to respective contacts 50 of the power line connector 46 to deliver power from the power line connector to the receptacle 68 of the power supply connector 66. The power supply connector 66 also includes a track 80 to guide and assist in securing a dependent connector 94 with the power supply connector 66.

Figure 11:
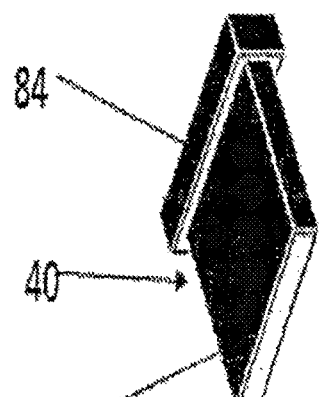
FIG. 11 is a perspective view of the terminal cap of the modular assembly of FIGS. 1-3.
Figure 12:
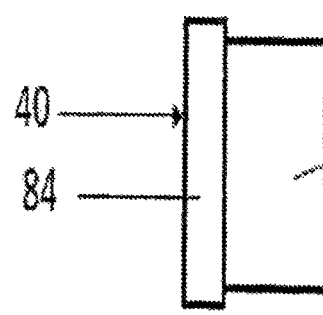
FIG. 12 is a side elevational view of the terminal cap of FIG. 11.
Figure 13:
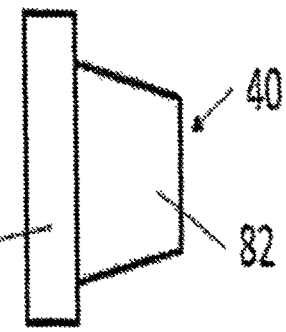
FIG. 13 is a side elevational view of an alternative terminal cap.

As shown in FIGS. 2 and 3, a terminal cap 40 may be used to close the receptacle 68 of FIGS. 4 and 5 and to reduce the risk otherwise associated with potentially live exposed electrical contacts. As best shown in FIGS. 11-13, the terminal cap 40 may consist of a non-conducting resilient molded element. The exemplary terminal cap has a tongue portion 82, removably insertable into the slot of a power supply connector, extending from an oval shaped hat portion 84. The tongue 82 may be rectangular, as shown in FIG. 12, or tapered as shown in FIG. 13.

Referring now to FIGS. 14-19 depicting certain details of an exemplary dependent modular unit 22, the modular unit 22 of FIGS. 2 and 3 has a main body 90 to which is installed an electrical device, in this case a duplex electrical outlet 92. The duplex electrical outlet 92 is provided with a threaded bore 93 accepting a screw, not shown for attachment of a cover plate 32 (shown only in FIG. 3). The dependent modular unit 22 may also be provided with a dependent power connector 94, not visible in FIG. 15, depending from one side of the main body 90.

The dependent connector 94 includes a tongue 96 for removable insertion into a receptacle 68 of a power supply connector 66, such as the one shown in FIGS. 4 and 5. A plurality of spaced elongated apart electrical contacts 98 is associated with dependent connector. Each dependent contact 98 may be disposed in a respective recess 100 in a surface of the tongue 96. Each of the dependent contacts 98 is positioned on the tongue 96 to electrically engage a respective one of the receptacle electrical contacts 70 in the receptacle 68 when the connectors are coupled together and to maintain electrical connection therewith in a range of relative positions of the tongue 96 in the receptacle 68. Each of the dependent electrical contacts 98 is connected by wires 102 within the dependent modular unit 22 to the duplex outlet 92 to supply power received by the contacts 98 of the tongue 96 from the contacts 70 of the receptacle 68 to the duplex outlet 92. As shown, the dependent electrical contacts 98 may be on surface of the tongue 96 that faces the main body 90 so as to minimize the risk of unintentional touching of the contacts 96 by hands, tools or other devices.

The recesses 100 and 72 in one or both of the connectors 94 and 66 may be proportioned to entirely contain the respective contacts 70 and 98 therein to further reduce the likelihood of an unintentional communication with a user or tool. However, at least one of the sets of electrical contacts 70 or 98 must extend outwardly from their respective recesses 72 or 100 at the time of interconnection of the connectors to assure an electrical connection. Since the power supply connector 94 is more likely to be live prior to the interconnection of the connectors 94 and 66, it may be preferable for the contacts 70 to remain with their respective recesses 72 and for the contacts 98 to extend resilient from their respective recesses 100. Alternatively, a feature, not shown, may be provided for advancing one or both sets of contacts towards each other at the time of interconnection.

The dependent power connector 94 also includes a flange 104 or other feature engageable with the track 80 of a power supply connector to guide and assist in securing the dependent power connector 94 with a power supply connector 66.

The dependent modular unit 22 may also be provided with a power supply connector 66a similar to the power supply connector 66 of the base modular unit 12 of FIGS. 4 and 5 for connection with the dependent power connector of another dependent modular unit. Each of the receptacle contacts 70a of the power supply connector 66a are connected by wires 108 within the main body of the modular unit 22 to respective contacts 98 of the dependent power connector 94 to deliver power from the dependent power connector 94 to the receptacle 68a of the power supply connector 66a. Thus, the power supply connector 66a of the dependent modular unit 22 is electrically in parallel with its duplex outlet 92.

It should be noted that while a power supply connector 66a is shown for dependent modular unit 22, for some modular units, it may not be desirable to include a power supply connector because it is not desirable or is forbidden by building codes to permit any additional devices to draw power from the line. For example, modular units having as their electrical device a 220/240 V AC outlet for an oven or clothes dryer may be made without a power supply connector.

It will be appreciated that the tongue 96 of a dependent power connector, such as dependent power connector 94 of FIGS. 14-16 may be removably inserted into the receptacle 68 of a power supply connector, such as power supply connector 66 of FIGS. 4-7 so as to provide power from one modular unit to another in a range of relative positions. This is desirable because, in use, this permits the installer to adjust the position of the dependent module relative to the wall surface so as to have a nice finished appearance after a wall plate is installed. However, it is also desirable to secure each dependent modular unit in fixed position once it is determined using a locking feature that is easily accessible by an installer.

Alternative exemplary pins 110 and 110' for locking together a power supply connector are shown in FIGS. 20-26.

Referring to FIGS. 20 and 21, a first exemplary pin 110 is shown having a generally square cross section with three rounded corners 112 of a first radii and a fourth rounded corner 114 of a different radii. The pin 110 has a tool engagement feature, such as a screw driver slot 116, at one end.

As shown FIGS. 22 and 23, a bore 118 is provided in one of the connectors, having an open edge 120 through a surface of that connector adjacent a surface of the other connector. In the example illustrated, the bore 118 is in the dependent power connector 94 with its edge 120 opening into a surface of the power supply connector 66. The bore is also near the track 80. The pin 110 is rotatably positioned in the bore 118 and, as shown in FIG. 20, may be positioned completely within the bore 110. The bore 118 may be shaped similarly to the pin 110 to facilitate the acceptance of the pin 110 in this orientation. As shown in FIG. 21 the pin 110 is rotatable within the bore 118 to another angular orientation where it extends from the bore 118 through the open edge 120 into engagement with a surface 122 of the tongue 96 of a dependent power supply 96. In the engaged position of the pin 110 shown in FIG. 21, the pin 110 may also be additionally or alternatively configured to deflect and advance the flange 104 into the track 80 of the power supply connector 66.

Thus, the connector system described above provides a positionable buss connection or a power docking station for connection for modular units having electrical devices.

Alternative fasteners and locking devices may be used to secure two connectors in position. An alternatively shaped pin 122 is shown in FIGS. 24-26 having an oval or elliptical shaped shank portion 110'. A pin 110 or 110' may be provided with a roughened surface, teeth or other features to increase the holding power of the pin. Other types of fasteners, such as threaded fasteners, locking pins, clamps, clips and ties may be used.

Still another fastening and locking system is generally illustrated in FIGS. 54-61.

Figure 54:
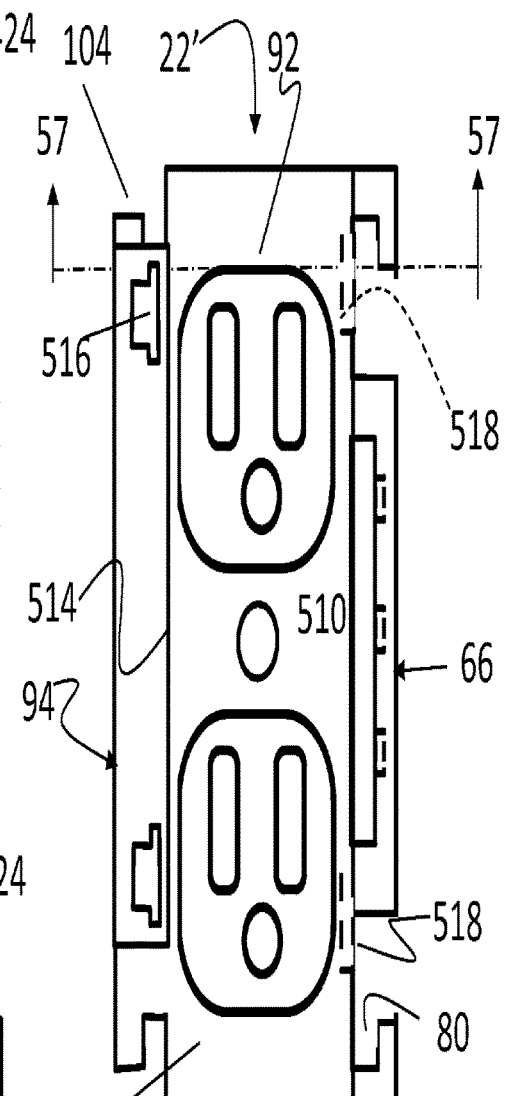
FIG. 54 is a front elevational view, with some internal components shown in dashed line, of an alternative dependent modular unit for use with an alternate module interlocking system.
Figure 55:
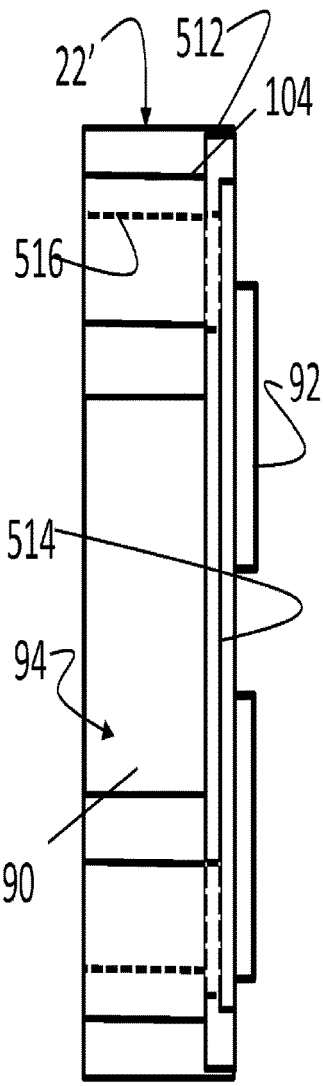
FIG. 55 is a side elevational view of the modular unit of FIG. 54.

Referring generally to FIGS. 54-61, still another alternative dependent modular unit 22' (FIGS. 54 and 55) may have an alternative module interlocking system 502 (FIG. 57) having a handle member 504 (FIGS. 57-58) and a pair of engagement treads 506 (FIGS. 57 and 59-61). Except as described below, alternative dependent modular unit 22' of FIGS. 54 and 55 is similar to dependent modular unit 22 described above with reference to FIGS. 14-16. In particular, modular unit 22' has a main body 90 to which is installed a duplex electrical outlet 92, a dependent power connector 94 with a flange 104 selectively engageable with a track of an adjacent base or dependent module (not shown), and a power supply connector 66 with a track 80 selectively engageable with the flange of an adjacent dependent modular unit (not shown).

In addition, module 22' of FIGS. 54 and 55 is provided with a top surface 510 having a flange or lip 512 extending over and the dependent power connector 94 and flange 104 and extending partially therebeyond in the direction of any adjacent modular unit that may be connected therewith. A recess 514 is formed in the top surface 510 and lip 512 of the main body 90 and a pair of elongated passageways 516 each having a T-shaped cross-section extend from the recess along opposite portions of the flange 104. The track 80 of power supply connector 66 may be provided with a pair of spaced apart tread portions 518.

The recess 514 and passageways 516 accept portions of the alternative module interlocking system 502 of FIGS. 57-61 and the tread portion 518 engages portions thereof in a manner described shortly herein.

Referring next to FIGS. 60 and 61, the alternative module interlocking system 502 includes a U-shaped handle member 504 having a pair of elongated legs 520 and a bridge portion 522 extending transversely between ends of the legs 520. The legs form a T-shaped cross-section by having elongated base portions 524 and elongated central flange portions 526 extending transversely from base portions 524. The central flanges 526 have stepped forward surfaces 528 and a guide pin 530 extending parallel to base portion 524 through the central flange in a location remote from the bridge portion 522. The bridge portion 522 extends between the legs 520 over the base portions 524 and central flanges 526 thereof and forward therefrom. The bridge portion 522 further has a finger grip 530 formed therein at a location between the legs 520.

Referring to FIGS. 56-59, the alternative module interlocking system 502 further includes a pair of engagement treads 506 (FIGS. 57-59) that are mountable to the legs 520 of the handle member 504, as generally shown in FIG. 6. The engagement treads 506 illustrated are elongated members having a tread surface 532 on one face and an elongated channel 534 in the opposite surface, the elongated channel being designed for sliding engagement with the central flange 526 of one of the legs 520 of the handle member 504. The channel 534 has a stepped base surface 536 having a shallower depth portion 538 and a deeper portion 540 corresponding to the stepped forward surfaces 528 of the central flanges 526 of the leg portions 520. The engagement treads 506 further have a stepped elongated keyway 542 extending therethrough generally corresponding to the shape of the stepped base surface 536 and extending therefrom in both directions. The keyway 542 accepts guide pin 530 of leg 520 of handle member 504 when engagement tread 506 is mounted to a leg, as shown in FIG. 56.

In use, the legs 520 of handle member 504 are inserted into the elongated passageways 16 of dependent modular unit 22' and two engagement treads 506 are mounted to the legs of the handle member to create the alternate module interlocking system 502. Guide pins 530 permits relative movement between the handle member 504 and engagement tread 506, which stays generally constrained relative to dependent module 22'. When modular unit 22' is to be installed, handle member 504 is withdrawn from top surface 90 of modular unit 22' permitting engagement treads 506 to be held close to modular unit 22'. Once dependent power connector 94 and a flange 104 are engaged with a power supply connector and track of an adjacent base or dependent module (not shown), handle member 504 may be depressed until bridge portion 522 is full engaged in recess 514 of modular unit 22'. As handle member 504 is depressed, guide pin 530 and stepped surfaces 528 and 536 drive engagement treads 506 into gripping engagement with a track of the adjacent base or dependent power supply connector.

As shown in FIG. 54, a track 80 of a power supply connector 66 may be provided with a tread 546 or similar engagement feature as well.

Separation of two modular units may be accomplished by reversing the above described steps, by gripping the finger grip 530 of bridge portion 522 of handle member 504 and pulling it away from the top surface 90 of modular unit 22'. As the handle member 504 is pulled away from the top surface 90 modular unit 22', legs 520 slide relative to engagement treads 506 until stepped surfaces 528 and 536 have moved about halfway relative to each other, at which point, guide pin 530 moves through a stepped portion of keyway 546 so as to retract the engagement treads 506 from engagement with the track of an adjacent modular unit. Further pulling on handle member 504 may will then pull modular unit 22' completely away from connection with the power supply connector of the adjacent modular unit.

Referring now to FIGS. 27-29 depicting certain details of another exemplary dependent modular unit 20 of FIGS. 2 and 3, wherein the electrical device is a power switch 124. Modular unit 20 has a main body 126 dependent power connector 94b, a power supply connector 66b, and wires, not shown, electrically connecting appropriate respective contacts of the connectors, similar to those described above, for interconnection with other modular units. The power switch 124 includes a manually actuated toggle 128, shown FIGS. 27 and 29, associated with switch contacts 130, shown only in FIG. 28, that are used to selectively supply power to a remotely located electrical device such as a light, fan or outlet. Wires, not shown, are provided within the main body of the modular device electrically connecting certain of the switch contacts 130 with the contacts of the dependent power connector.

The main body 126 of the dependent modular unit 20 includes a power line connector 46a similar the power line connector 46 of the base modular unit 12 of FIGS. 4-7 for rapidly interconnecting certain contacts 130 associated with the power switch 124 to respective wires 132 of a power line 134 leading to the device, not shown, to be controlled by the power switch 124. It should be noted that the power line connector 46a needs to be positioned so that the lever 60a of the power line connector 46a does not interfere with the connection of adjacent modular units when they are assembled in a series or train. Therefore, the power line connector 46a may be installed in a bump out portion 136 of the backside 138 of the main body 90, as shown in FIGS. 28 and 29.

Alternatively, as shown in FIGS. 30 and 31, a modular base unit 20b may have a power line connector 46b may be installed in an orientation ninety degrees from that of power line connectors 46 and 46a, wherein the lever 60b is located on the backside 138 of the main body 90b.

Alternative types of power line connectors may be used. For example, as shown in FIG. 32, instead of using a cam shaft as described above, a power line connector 46c may have a plurality of screws 140 each rotatable to be driven into engagement with a respective wire 52c of a power line 130c to drive the respective wire 52c into engagement with a respective contact 50c.

It should be noted that the wiring system of FIGS. 2 and 3 using the modular units 12, 20 and 22 of FIGS. 4-31 described above may be more easily installed than the prior art wiring system 2 of FIG. 1. In particular, to install the prior art wiring system 2, an installer must install the box, thread the wires through the back of the box, individually connect each wire of both power lines 7 and 8 to contacts of the switch, individually connect each wire of power supply line 7 to respective contacts of each of the two outlets, individually position each of these devices in the electrical box 3 while carefully collapsing the wiring into the box without breaking the wiring or loosening a connection, and attach each device to the electrical box 3 by a pair of screws.

In contrast, the wiring system 10 of FIGS. 2 and 3 is installed by fastening the base modular unit 12 to a stud 14, engaging the dependent connector 94 of each dependent modular units 20 and 22, with the power supply connector 66 of a prior unit, inserting a terminal cap 40 into the power supply connector 66 of the final unit, and rotating the pins of FIGS. 20-26 a one-quarter turn to lock the train of modular units together.

Furthermore, the installation of a switch plate 32 is also simplified because, for the prior art, each of the electronic devices have to be individually adjusted by a pair of screws to be properly located, while, so long as the dependent modular units 20 and 22 were originally installed to present a coplanar face, typically only the first modular unit 20 needs to be adjusted to properly position the downstream modular units 22.

To be clear, while the modular units 12, 20, 22 and 24 shown in FIGS. 2 and 3 are connected in a mechanical series or train of components, the various electrical devices in consecutive modular units may be connected electrically in series or electrically in parallel, depending on the internal wiring of the upstream modular unit. Thus, if it desired to use the power switch 26 of the first dependent modular unit 20 to control only the power line 30, the first modular unit may be wired so as to deliver power from its dependent connector 94 to both its power switch 26 and its power supply connector 66, as shown schematically in FIG. 47. In particular, as illustrated, the current flowing through the hot wire H neutral wire N and ground wire G of the power supply connector 66 may flow directly respectively from the hot wire H, neutral wire N and ground wire G of the dependent connector 84. Alternatively, if it is desired to use the power switch 26 of the first dependent modular unit 20 to control the supply of power to the device in the next downstream modular unit, in the case illustrated, the duplex outlet 28 of the second modular dependent unit 22, then the first dependent modular unit 20 may be wired so to deliver power from its dependent connector through its power switch 26 to its power supply connector 94, as shown schematically in FIG. 48. In particular, as illustrated, the current flowing through the hot wire H of the power supply connector 66 must flow from the hot wire H of the dependent connector 84 through power switch 26. Modular units may have both types of wiring plus a selector switch 142 to allow a choice between the provision of a series or parallel connection through the modular unit, as shown schematically in FIG. 49. The selector switch may be on the backside 138 of the main body 90 so as to be usable by an installer to select between these choices or, alternatively, on the front face of the main body 90 and available to any user to alter the operation of the power switch 26. It should be noted that for the examples shown in FIGS. 47-49 the power switch only controls the current through the hot wire H, and passes the current through the neutral wire N and ground wire G, but the principal applies to multiple throw switches that shut of multiple lines, as well as to other electronic devices other than power switches as well as to base modular unit wiring.

There are several ways to obtain a three-way switching capability with modular units. This may be accomplished with directly wiring power between multiple switches and a controlled device, such as a light fixture, connecting them only by data links, or by a hybrid of these approaches.

For example, a controlled device may be provided with a data receiver and voltage controller which responds to inputs from multiple switching modular units located at convenient locations that have a data sender communicating with a user operated switch. In this case, the power to the controlled device need not come from one of the switching modular units. The data senders in the modular units may communicate with the data receiver by any convenient means including direct or indirect and wired or wireless communication. Alternatively, a local modular unit may be wired directly to the controlled device to provide power to the controlled device. The local modular unit has a local user operated switch, a controller wired directly to the controlled device, and a data receiver. A remote modular unit has a remote user operated switch and a data sender that communicates a change in the setting of the switch directly or indirectly to the data receiver. The data receiver uses the inputs from the local switch and the remote switch, and perhaps other input s, to determine whether or not to provide power to the controlled device.

Figure 52:
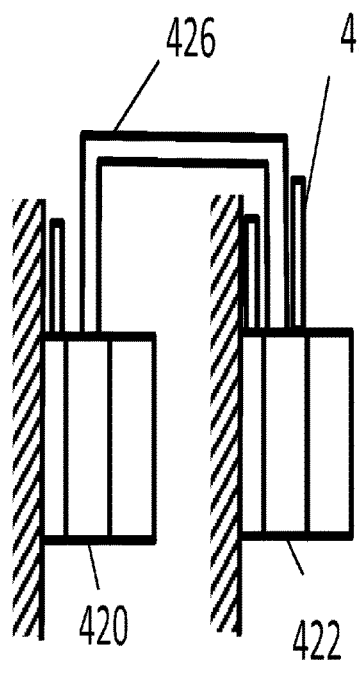
FIGS. 52 and 53 are schematic views of alternative three way switch wiring using modular units of FIGS. 1-49.

Alternatively, as shown in FIG. 52, the user operable switches in remote modular units 420 and 422 may be wired together by a power line 424 to provide selectable power to the controlled device, not shown by way of another power line 426 connected to one of the modular units 420 or 422. In particular, the modular units 420 and 422 may be connected, using respective power line connectors, by a power line 424 having three or more wires, depending on the power availability and needs at the two switch locations. A three wire power line 424 could connect the switches with two switchable power wires and a non-switched power wire similar to the wiring of many prior art three way switch systems. A fourth wire may be provided for grounding.

Figure 53:
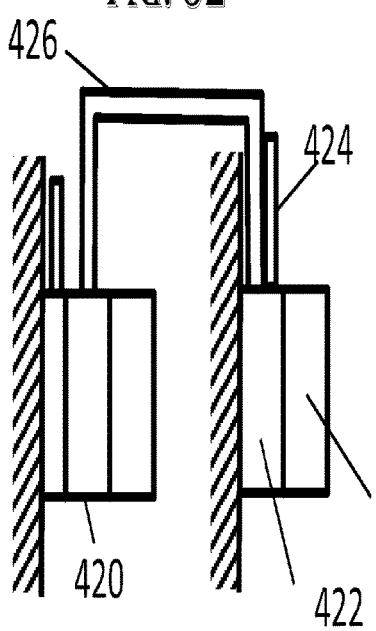

In some installations, a first of the switching modular units 420 is connected to the structure's power system while a second of the switching modular units 422 is only powered by the power line 420 from the first modular unit. In that case, the unpowered modular unit may be mounted to an unpowered base unit 428, or mounted directly to the structure in a convenient manner, as shown in FIG. 53. In such installations, the second modular unit 422 may pass on switched power through its power supply connector. Alternatively, a four wire ungrounded power line or a five wire grounded power line 426 may be used to connect the two switching modular units 420 and 422, the extra wire being used to provide non-switched power to the power supply connector of the second modular unit for delivery to a downstream modular unit 430.

In still other installations, as referenced later herein in connection with FIG. 62, both switching modular units are installed at powered locations. In such installations, the modular units may still be connected by a 3 wire ungrounded or 4 a wire grounded line. The switching modular units both pass the power from their respective base modular units to their respective power supply outlets, but, in such installations, only one of the switches is connected to get power from its respective base modular unit. It may be desired to make only one type of switching modular unit and incorporate a selector switch to select between a master setting, for a three way switch that gets power from its base modular unit, and a slave setting, for a switch that does not.

FIGS. 33 and 34 illustrate alternative dependent modular units 144 or 144' having as their electrical devices a prewired box 146 or 146' for the installation of one or more conventional prior art electrical device of a type which would be used for a prior art wiring system 2 and installed in an electrical box of the type shown in FIG. 1. As shown in FIG. 33, a box 146 may be designed to accommodate a single electrical device, not shown, using the standard footprint. Alternatively, as shown in FIG. 34, a box 146' may accommodate two or more electrical devices, not shown, each using the standard footprint or a single electrical device, not shown, that is wider than the standard footprint. The dependent modular units 144 or 144' may have internal wiring 148 or 148' within the box 144 or 144' prewired to a dependent connector 94 and/or to a power supply connector 66. As shown in FIG. 34, the dependent modular unit 144' may also have data wiring 150, such as a coax cable, prewired into the box 146' to one or both of the connectors 66 and 94 or to another external connector, not shown, on another wall of the box.

FIGS. 35 and 36 illustrate a dependent modular unit 156 having as its electrical device a socket 158 for a conventional light bulb, not shown.

It will be appreciated that, in prior art installations of structural wiring systems 2, the electrical box 3 and the power lines 7 and 8 (see FIG. 1) are installed to the studs or other structural elements prior to the installation of wall surface material, such as drywall or paneling. At the time that the wall material is installed, an aperture is cut into the wall surface material for later installation of one or more electrical devices into the electrical box 3. In many instances, the inner wall of the electrical box 3 is used by the wall installer to guide the cutting of the aperture. The electrical devices, such as the switch 5 and duplex outlets 6, arc typically installed towards the end of the process to reduce their exposure to dust, power tools and theft and so that they will not interfere with sanding of drywall surfaces.

The modular wiring system 10 of FIGS. 2 and 3 does not require use an electrical box. Instead, it uses a base modular unit 12 that may be installed, along with power lines 16 and 30, prior to the installation of the wall surface 36. It also uses dependent modular units 20 and 22 that may be installed later, after the wall surface 36 is installed and finished. As a result, the modular system 10 does not include any component that can be used by the wall installer as a guide for making the appropriate aperture for later installation of the dependent modules. Therefore, it would be useful to have a removable or severable template for that purpose.

Referring to FIGS. 37-39, an exemplary template 160 is shown for use in guiding the cutting of an aperture in a wall surface 36, shown only in FIG. 3, in preparation for the later installation of modular units. The template 160 includes a basket configuration 162 having a rectangular base wall 164 and four rectangular or trapezoidal side walls 166 extending from the base wall 164. The inner surface 168 of the upper portion of the side walls 166 together define the shape of the nominal aperture required for admission of one or more dependent modular units. A tongue 170, similar to the tongue 82 of a terminal cap 40, as described above in reference to FIGS. 11-13, extends from one of the side walls 166 for temporary attachment of the template 160 to a power supply connector 66 of a base modular unit 12. A pair of finger sized apertures 172 is provided in the base wall 166 for manual gripping of the base wall.

The template 160 is made of a moderately flexible material that will allow it to generally hold its shape when temporarily installed to a base modular unit 12, but manually reshaped for subsequent removal by gripping it through the finger apertures 172 and squeezing. The template 160 may be disposable or, if made of a resilient material, may be reusable.

In use, a template 160 of the desired size is removably attached to an installed base modular unit 12 prior to installation of the wall surface 36. The template 160 is then used in a manner similar to the electrical box 3 of the prior art to guide the cutting of an appropriate aperture in the wall surface 36. The template 160 is then removed through the aperture by squeezing and reshaping the template using the finger apertures 172. If a larger aperture is needed at the time of installing replacement or additional modular units, an appropriately sized resilient template 160 may be used which may be squeezed through the existing aperture and temporarily installed to the power supply connector 66 of a base modular unit 12 or a dependent modular unit 20 or 22.

FIGS. 4A and 4B illustrate a modular base unit 12' incorporating a severable template 160' which may be a rectangular frame extending transversely from the modular base unit. The rectangular frame may be proportioned to admit one or more dependent modular unit.

In use in new construction, the base modular unit 12' is attached to a stud and defines a surface similar to that defined by the interior of the side and top walls of a conventional junction box against which an installer may cut an appropriate aperture during the installation of the drywall or other wall surface. A portion of the template 161 may be removed to facilitate installation of oversized or multiple dependent modular units, for example, by severing the template along line 163, which may be designed with a severable cross-section for that purpose, such as a surface with perforations, a reduced thickness or other feature facilitating severing.

In use in structures with existing wall surfaces, the external surface of template 161 may be used to trace a pattern on the wall surface for cutting an appropriate sized and shaped aperture. The template may be severed if desired before installation of the base modular unit 12'.

Figure 40:
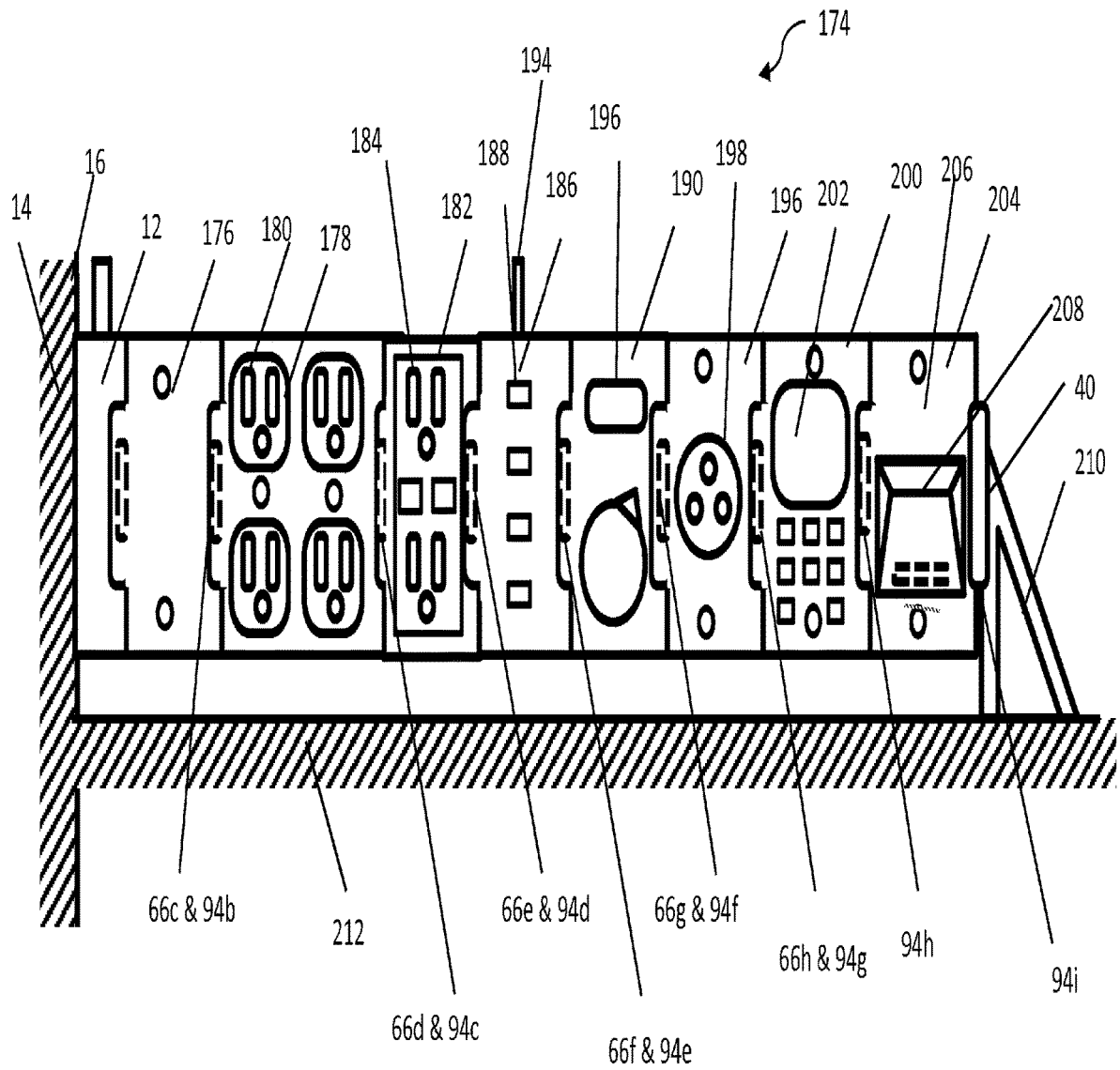
FIG. 40 is an elevational view similar to FIG. 2 but illustrating a train of alternative exemplary dependent modular units sequentially interconnected to a base modular unit and supported at its farthest end from the stud by a support member.

FIG. 40 shows an alternative exemplary series or train 174 of modular units providing further examples of the variety of special purpose functions which may be available from modular units. The modular train 174 illustrated in FIG. 40 is provided as exemplary of certain types modular units, rather than as a limiting example of specific train that may be used in practice and is provided to illustrate the flexibility of the modular wiring system 10 and the components thereof.

It should be noted that there are many types of home systems that would benefit from dispersed inside and outside modules for sensing local conditions, controlling local devices or communicating with occupants at multiple locations. These include safety and security, environmental control, power consumption regulation, remote control, data, communication and infotainment delivery, and animal control. Modular units for safety and security systems may include motion light and sound sensors, alarms, gas leak and carbon monoxide sensors, and cameras, Modular units for environmental control may include temperature and humidity sensors, heaters, coolers, fans, humidifiers, dehumidifiers, Modular units for power consumption regulation may include UPS systems, circuits breakers, timers, and devices controlled by signals from power companies. Modular units for remote control may include X10 and similar devices and command input devices. Modular units for data include computers and computer peripherals, such as printers, scanners, USB devices, memory devices and RFID readers. Modular units for communication and infotainment may include phones, intercom units, door bells, microphones, cameras, speakers, video monitors, radio tuners, and CD, DVD and USB readers. Modular units for animal control may include devices broadcasting a signal for defining a wireless fence boundary.

Such systems have not been easily implemented in a built-in configuration in the past, especially in retrofit installations, because of the complexity of installing each device and the need for a power and a data connection at multiple locations. Similarly, new technology using intelligent switching, lower voltage levels, etc. are slow to adoption or may be of value for only 2 to 5 years before they arc obsolete. The modular wiring system disclosed herein, as exemplified by train 174, allows rapid installation of units of these systems, such as those described below. It further facilitates rapid upgrading by removing plate, replacing module and reinstalling plate. It also allows renters and sellers to install and then remove any such special devices that they would prefer, because of their large investment in these systems, not to leave when they move and reinstall in their next home.

In particular, a 120 V AC base modular unit 12 is connected to a stud 14 and power line 16. A first dependent modular unit 176 having as its electrical device a power line filter to filter adapted to filter current spikes is electrically and mechanically connected to the base modular unit 12. Rather than passing unfiltered AC current to its power supply connector 66d, the first dependent modular unit 176 passes the filtered current, effectively placing any device connected thereto in electrical series with its filtering circuitry. It will be appreciated that multiple functions may be provided by a single modular unit. For example, if desired, the first depend modular unit 176 may also include a UPS device. Alternatively, the current filtering components of the first dependent modular unit 176 could instead be incorporated into the base modular unit 12.

It should be noted that the first modular unit 176 may not have any switches or other components that need to be accessed by a user once the device is installed. It therefore may be hidden behind the wall surface 36, if desired or alternatively behind a cover plate 32.

A second dependent modular unit 178, having as its electrical device a quadplex outlet 180, is mechanically and electrically connected to the first dependent modular unit 176 and receives the filtered AC current therefrom through its dependent connector 94e. The second dependent modular unit 178 passes to its power supply connector 66e the current that it receives from its dependent connector 94e, effectively placing any device connected thereto in electrical parallel with the outlets 180.

A third dependent modular unit 182, having as its electrical device a GFI outlet 184 is mechanically and electrically connected to the second dependent modular unit 178 and receives filtered AC current therefrom through its dependent connector 94f. The third dependent modular unit 182 may directly pass to its power supply connector 66f the current that it receives from its dependent connector 94f or, in alternative embodiment, may pass current that first passes through the GFI switch circuitry, so that subsequent devices connected downstream of the third dependent modular unit 182 may be protected by the GFI circuitry.

A fourth dependent modular unit 186 having as its electrical device a USB multi-port device 188 is mechanically and electrically connected to the third dependent modular unit 182. The fourth dependent modular unit 186 illustrated does not use the electrical power supplied by its dependent connector 94g and instead merely passes the power on to its power supply connector 66g. The USB multi-port device 188 is connected, for example by a data line or by a wireless antenna to computer or network, not shown, and permits a user to connect any compatible USB device to that computer or network. In an alternative embodiment, the USB multi-port device 188 does receive power from the current received by the dependent connector 94g of the fourth dependent modular unit 186 and the USB jacks may be used as a charger for devices that use a USB connector for that purpose.

Alternatively, the fourth dependent modular unit 186 may have other type of data ports, not shown. For example, the fourth dependent modular unit 186 may have phone jacks for the interconnection of standard fixed telephones, not shown, to a home phone system, not shown, directly wired to the modular unit 186 or communicating wirelessly, such as through wifi, with a home phone system or with a computer using a VOIP service.

A fifth dependent modular unit 190 having as its electrical device a motion sensor and/or timer switch 192 is mechanically and electrically connected to the fourth modular unit 186 and electrically connected to a power line 194 for a device, not shown, such as a light and/or fan. Alternatively or additionally, the fifth dependent modular unit 190 may incorporate a rheostat or other dimmer functionality, a fan speed functionality, a thermostatic functionality or other environmentally responsive or programmable control functionality.

A sixth dependent modular unit 196 having as its electrical device European or other non-US standard electrical outlet 198 is mechanically and electrically connected to the fifth dependent modular unit 190. If needed, the fifth dependent modular unit 196 may incorporate adapter circuitry to convert the power received from the dependent connector 94h to the form that is required for the non-US standard outlet. The sixth dependent modular unit 196 may pass to its power supply connector 66h the 120 V AC current received at its dependent connector 94h or, alternatively, may pass the converted power to it power supply connector 94h. If converted power is provided, the power supply connector 94h may be configured differently, as described elsewhere in this specification.

A seventh dependent modular unit 200 having as its electrical device an intercom station 202 is mechanically and electrically connected to the sixth modular unit 196. The intercom station 202 is wirelessly connected or wired to an intercom system or a computer network operating an intercom system, not shown, and provides one or more of the traditional functions of an intercom such as voice and/or video communication, shared background music, door answering, room monitoring, station-to-station calling. Alternatively or additionally, the intercom station 202 may provide inputs and output to an alarm system, provide automatic notification of broadcast weather hazards, provide audio outputs from a calendar system, and manage other audio and video inputs and outputs for a computer network.

Alternatively, electrical device in seventh dependent modular unit may be a hands free telephone unit allowing hands-free and wireless access to a VOIP phone system.

An eighth dependent modular unit 204 having as its electrical device a portable device charging station 206 is mechanically and electrically connected to the fifth modular unit 200. The eighth dependent modular unit 204 includes a pocket 208 or other system for mechanically engaging a portable device, such as a calculator, game or cell phone, not shown. Charger circuitry is contained in the modular unit and provides the portable device with power through a physical connector, such as an iPhone jack or USB connector or via a wireless system.

At the end of the series or train 174 of modular devices, a terminal cap 40 may be provided to close the power supply connector 94i of the final, and in the example illustrated, the eighth dependent modular unit 204. A support 210 may also be provided at the end of a long train 174 of modular units to provide additional support and rigidity. In the example illustrated, the support 210 is a bracket connected to a horizontal cross member 212 extending between two studs, but a support 210 may alternatively be connected to any structural component such as a stud. In an alternative embodiment, the support 210 may incorporate the terminal cap 40.

FIGS. 41-44 illustrate still other exemplary trains 300, 300a, 300b and 300c of modular units providing further examples of the variety of special purpose functions which may be available from modular units and some of the ways in modular units may be advantageously be combined in a series or train.

Figure 41:
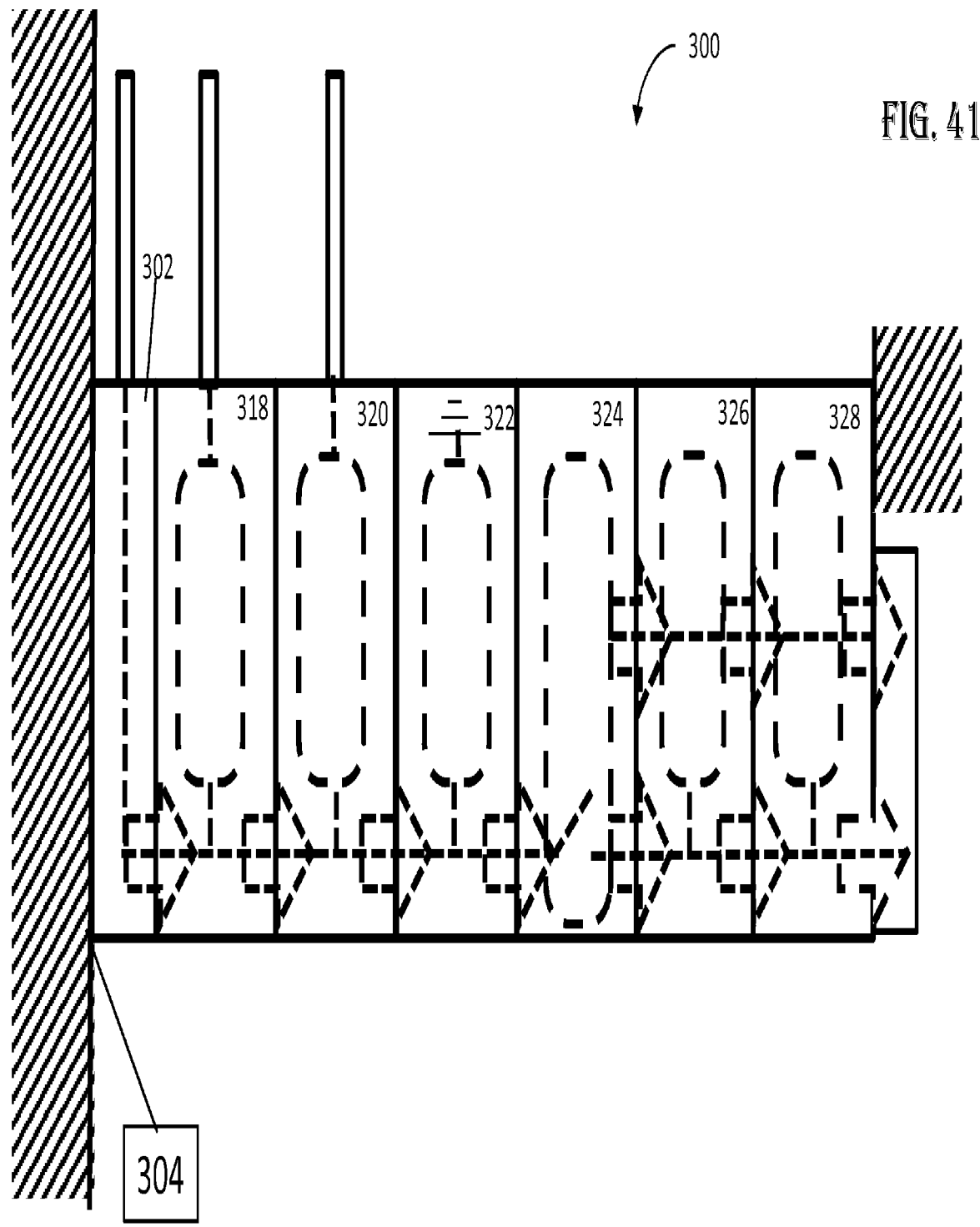
FIG. 41 is schematic view of a generalized exemplary modular assembly according to the present invention having a generic base modular unit attached to a wall stud and a train of sequentially connected exemplary modular units, each having an exemplary electronic device using electrical power.
Figures 47, 48, 49:
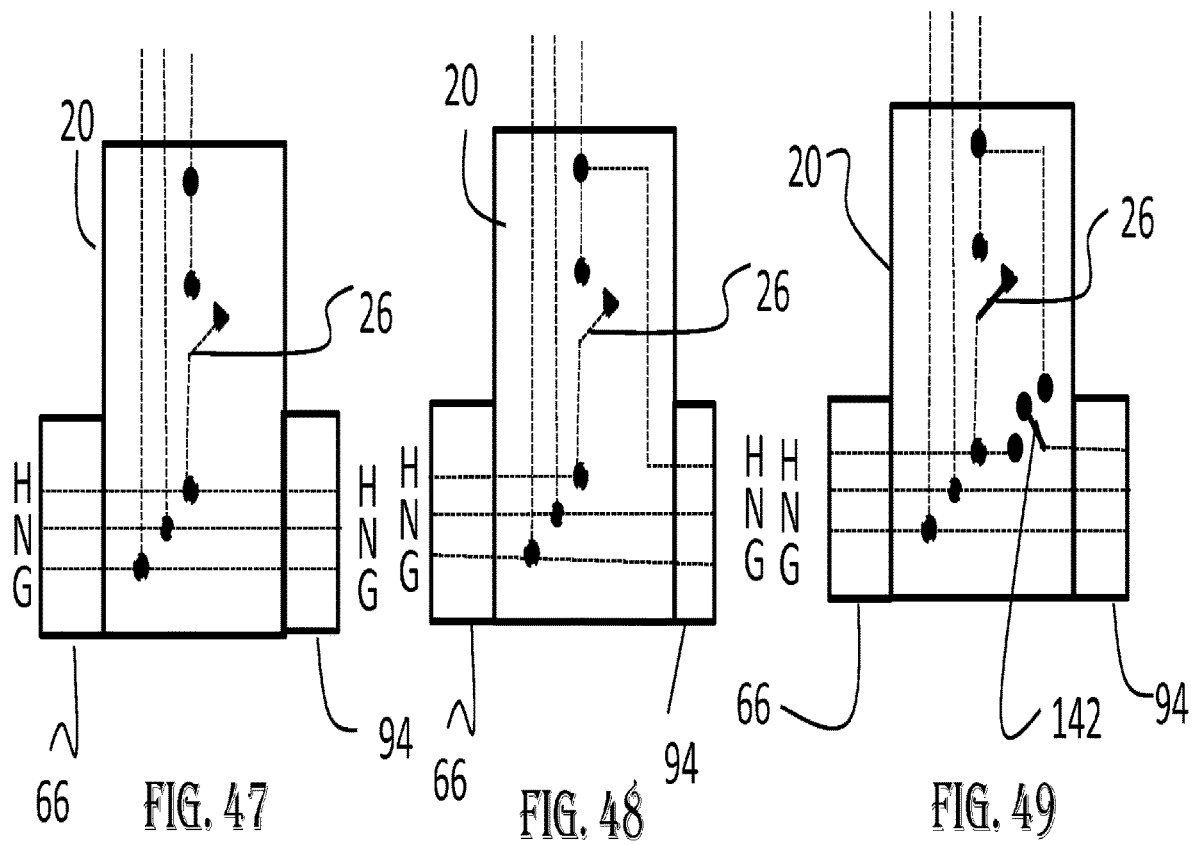
FIGS. 47, 48 and 49 are schematic views, respectively of a parallel, series and switchable modular unit.

In particular, in the train 300 shown in FIG. 41, a base modular unit 302 is connected to a stud 304 and a power line 306 and provides power to various modular units 318, 320, 322, 324, 326 and 328. However, the first three dependent modular units 318, 320 and 322 use a first type of power and/or data while the last two dependent modular units 326 and 328 may require a second type of power and/or data not used by the first three dependent modular units, but provided by a modular unit 324. The modular unit 324 may, for example, provide power line filtration, GFI shut off, a conversion from AC to DC, or a different voltage level. The modular unit 324 may alternatively or additionally provide data communication with the downstream modular units, delivered through the connector in a manner described elsewhere in this specification. A terminal cap 40 may be adapted to close both the power and data connections of the final dependent modular unit.

As a practical example, the first and second dependent modular units 318 and 320 may be power switches that selectively supply light fixtures, not shown, with 120V AC power. The third dependent modular unit 322 may be a smart outlet or other device that communicates wirelessly with remote devices in the building. The fourth dependent modular unit 324 may convert the power to 12 DC and provide that power and data communication with the fifth and sixth dependent modular units 326 and 328 which may be 12 DC electronic devices that are parts of a home safety or security system.

In the train 300a of FIG. 42, a base modular unit 302a provides power which is passed sequentially to three dependent modular devices 318a, 320a and 322a. The base modular unit 302a incorporates an electrical device 348 that communicates data with the electrical devices in the dependent modular units connected to it. For example, the dependent modular units 318a, 320a and 322a may provide power demand information and the base modular unit 302a may communicate control information to regulate the operation of the dependent modular units to limit the total amperage used at any time by the train 300a of modular units or may communicate wirelessly with a central control system, not shown, located elsewhere in the structure or at the power company to manage power usage. For example, each modular unit may include an RFID tag capable of communicating the amperage or other characteristics of the electrical device in the modular unit.

In the train 300b shown in FIG. 43, a base modular unit 302b converts a first type of power from the power line 304b to a second type of power to supply the downstream modular units 318b, 320b and 322b and/or to a power line 310b that may lead to remote devices or to a remotely located modular unit, not shown, to which other modular units using the second type of power may be attached. For example, in a home wired for US standard circuitry, the base modular unit 302b may be chosen to allow outlets that can be used for another international standard. This example would allow for rapid retrofit for homes that are used temporarily by expatriate executives who prefer to bring some of their electronic devices with them. It also facilitates quick retrofit if and when new standards emerge, such as an extra low voltage system that has been long proposed for increased safety. In the example illustrated, dependent modular unit is a terminal unit in that it does not have a power supply connector for attaching an additional dependent modular device.

Alternatively, base modular unit 302b may convert incoming power to an extra low voltage data standard for delivering data to downstream as well as to remotely located modular units. In this example, power line 310b may be a less expensive extra low voltage line, an Ethernet line, or other type of data line. Thus, base modular unit 302b may be used as a connection point for lower cost wiring to additional nearby locations that require low voltage or data wiring but do not require 120 V wiring.

In still another alternative configuration, rather than converting power to a different voltage or current standard, the base modular unit 102b may provide filtration against power spikes, uninterrupted power in the event of a short term power outage, local circuit breaker functionality, local power generation or other power control functionality for the three dependent modular units and remotely located devices connected to power line 110b.

FIG. 44 illustrates a variety of alternative features, characteristics and configurations for modular units. In particular, FIG. 44 illustrates a train 300c wherein a base modular unit 302c mounted to a lower surface of a horizontal structural component 310, such as a wood cross member extending between two adjacent studs. A first dependent modular unit 318c is connected to the base modular unit 302c and extends downwardly therefrom. The first dependent modular unit 318c incorporates as its electrical device a touch screen computer 312, similar to a smart phone or tablet device. The first dependent modular unit 318c may have multiple power supply connectors 366 on its side edges 368 and/or its bottom edge 370, which may be power and/or data connectors, for selective connection of multiple modular units 320c, 322c, 324c, 326c, 328c and 330c. The modular units connected to the first dependent modular unit 318c may include peripheral devices for the computer, such as devices for data communication, collection or storage, compact printers, readers, speakers, or scanners.

It will be appreciated that, as shown in FIG. 44 and elsewhere in the drawings, that modular units may not necessarily conform to the standard footprint, where appropriate for functional or design reasons. If desired, a modular unit may include a portion that is within the standard footprint for purposes of use with a standard cover plate, but also include a portion that extends beyond the standard footprint which is hidden below the cover plate, the wall surface, or both.

A variety of modular unit types may be made corresponding to different incompatible power standards currently used or later established globally. These standards include the various power types standardized by national standards groups or regulated by building codes. Each may have a unique configuration for its assigned power supply connector and dependent power connector to inhibit unintentional connection of incompatible units. These configurations may differ from each other, for example, in the cross sectional geometry of their receptacles or their tracks or both. For example, the receptacles and their respective tongues may be wide rectangular, narrow rectangular, or oval in cross section, as shown, schematically at 380, 382 and 384, respectively, in FIG. 45, or may be keyed in some manner, as shown schematically at 386 in FIG. 46. Similarly, the tracks may be differently angled or proportioned. For some connectors, the track may be on the dependent power connector.

These configurations may additionally or alternatively differ from each other in the location of their contacts. It is also possible to have connector shapes which permit upstream interconnections while preventing downstream interconnections where the compatibility of the components requires such a design. This may be accomplished, for example, by using a parallelepiped receptacle and tongue for the more broadly usable standard and a tapered receptacle and tongue for the more narrowly usable standard, such that either tongue will fit in the receptacle for the broader standard, but only the tapered tongue will fit in the receptacle for the narrower standard. For example, a modular device requiring grounded AC may have a dependent power connector that may plug into only a grounded power supply connector, while a modular unit that does not require grounding can be plugged into either a grounded or ungrounded power supply connector. This may be important where the modular units are installed to replace existing prior art devices in a structure that does not have grounded wiring.

Alternatively or additionally, intelligent electronic means, based on recognition of connector type or output type or data communication between modular units, may also be provided to prevent operation of devices which have been connected to an inappropriate power source.

Additional contacts may be provided on the receptacles and tongue for to provide a data interconnection through the connectors. The data may be analog or digital or may use a radio carrier. The contacts may be on the surfaces of the tongues and receptacles opposite those having power wiring, on the edges of the tongues and receptacles, or, where sufficiently low voltage, on surfaces of the track and follower. There may be assigned positions for specific types of data contacts, such as USB, Ethernet, and analog audiovisual data. Alternatively, a specific standard, such as USB may be used universally for all connectors.

If desired, certain modular units may provide two power or data standards, such as low voltage, such as 120 V AC, as a first standard and low voltage and/or data as a second standard. Thus a modular unit may low voltage contacts on one side of the receptacle and extra-low voltage and/or power contacts on the other side. These would be compatible with three types of dependent modules, those having contacts on their tongues for low voltage, those having contacts on their tongue for low voltage and/or data, and those having both types of contacts.

Alternatively, data may be delivered between modular units by wires directly connected between outlets on the backside of modular units that are interconnected at the time of installation. Wireless data or wireless low voltage power may also be delivered between modular units, for example, by using inductive coupling or power line carrier signals. Modular units may alternatively have passive data systems, like radio frequency identification tags to report information to other modular units with active data processing capability.

In new construction, base modules may be installed behind wall surface in convenient locations where built-in modular devices may be desired in the future.

A structure may be prewired with a network of powered base modular units providing an infrastructure for later installation of home device systems. They may use a single power standard, such as 120 V AC at all locations or dual or multiple standard system with low voltage level such as 120 V AC. delivered to some locations where such voltage is needed and a lower voltage, such as 42 V or 12 V, going to additional locations to permit flexibility for locating devices while minimizing the risks and costs associated with higher voltages. Both voltage types may be going to some or all of the locations getting 120 V. For example, some switches for controlling fixed lights or fans may be at low voltage and communicate with the lights by low power data line or a wireless signal. Thus, instead of wiring lights and fans directly through switches, only low voltage wiring is required to the switch location. This would reduce the cost of new wiring for new or remodeling construction because fewer higher voltage lines are needed. This further reduces the complexity of remodeling, as low voltage wiring is easier to install in existing walls.

Modular units may incorporate power generation componentry. For example, a modular unit may incorporate may incorporate a solar collector capable of being the sole source or a backup source of extra low voltage to another electrical device in the modular unit, to a downstream modular unit, or both. A compact power generator may be combined with a power storage device. Power generators for outdoor use may convert power from wind, wave, light or other electromagnetic source, or from a fuel.

While all of the exemplary modular units described above are described in the context of an in-wall installation at approximately shoulder height, as is typical for the installation of structural light switches, it will be appreciated by those skilled in the art that the modular wiring system disclosed herein is sufficiently robust for widespread standardization and rapid and reliable interconnection of diverse devices in diverse environments. For example, modular units described above or additional modular units may be designed for optimum or sole use within walls at or near baseboard height, at or near shoulder height or at other heights or locations as desired. For example, modular units designed for use at baseboard height may incorporate more features to minimize risks associated with young children and pets. Similar or different modular units may be designed for optimum or sole use on a ceiling, floor, door, or other structural element of a building.

Figure 50:
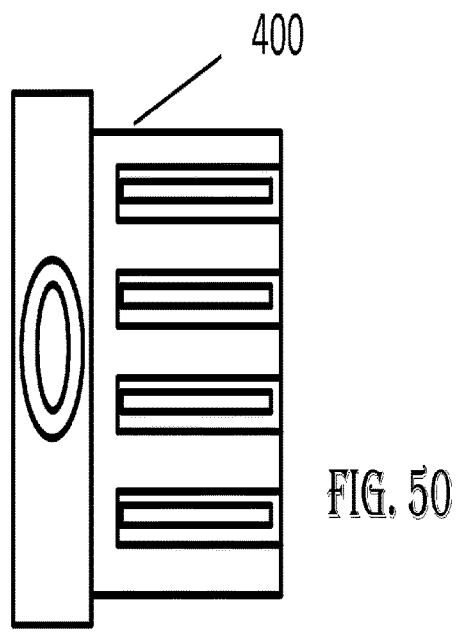
FIGS. 50 and 51 are top and side views, respectively, of a plug compatible with the modular units of FIGS. 1-49.
Figure 51:
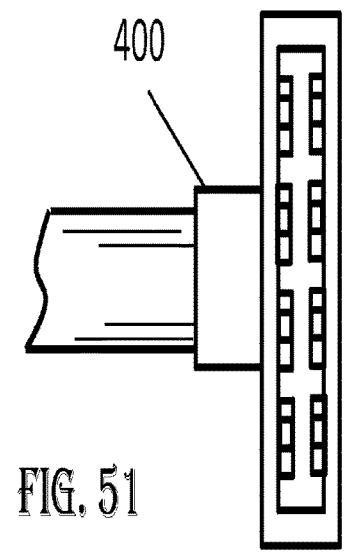

For example, modular units having suitable anchoring and weight support features may be designed for ceiling installation of heavy fixtures. Alternatively, ceiling fixture may be physically connected to the structure by conventional means, while the power line for a ceiling fixture may be connected to a base modular unit by using a plug 400 that incorporates a dependent connector, as shown in FIGS. 50 and 51. It should be noted that a plug 400 may alternatively be used as part of an extension cable for providing power to a nearby newly installed base unit.

Modular weight sensors or floor buttons, not shown, may be designed for floor installation.

Certain modular units may be designed or rated for installation within duct work for connection devices such as sensors, fragrance dispensers, air filters, fans, heaters, coolers humidifiers, dehumidifiers or pest control devices. Common or specially designed modular units may be designed for installation at appropriate vertical or horizontal structural surfaces for near special purposes areas such as those for work, entertainment or food preparation. Such areas include areas near desks and workstations, work or hobby benches, food preparation or serving surfaces, entertainment centers, book cases or Deejay tables. Modular units for such areas may include electrical devices providing power, data, radio signal or mechanical power inlets and outlets for such devices as microphones, speakers, amplifiers, audiovisual components, food processors, can openers, food warmers, food coolers, data processors, data input or output devices, or may directly incorporate such devices. Different modular units may be designed and rated for use in and tolerance of different types of environments, such as in doors or outdoors, low humidity, high humidity or wet installations, residential or commercial, permanent onsite assembled structures or modular structures or portable structures, as well as new installation or retrofit installation.

Refer now to FIG. 62, illustrating a room in a structure into which has been installed multiple base modular units 552-568, either as new installation or retrofit or both, interconnected by conventional electric power lines 572 or data or low power lines 570 or both or where some are connected to separate circuits, not shown. It will be appreciated that the system of the present invention allows easy replacement, upgrading or repurposing of the locations of dependent modular units connected to base modular units 552-568. It will be appreciated that any of the base modular units 552-568 may be a location for installing many of the types of electrical devices described above, including controllers and sensors and controlled devices which can interact with each other without a direct power or data connection therebetween as long the base module provides sufficient power for the device and the device has communication capabilities.

For example, base modular unit 554 may provide a retrofit electrical outlet installation, using a power supplying dependent modular unit, such as the one shown at 420 in FIGS. 52 and 53, installed to base modular unit 552 of FIG. 62 and a power receiving electrical outlet module, such as the one shown at 422 FIGS. 52 and 53, installed to base modular unit 554 of FIG. 62.

Base modular unit 552 of FIG. 62 may initially have a power switch directly controlling power to a light at modular unit 556 but may be upgraded by replacing the dependent modular unit at base modular unit 552 with one incorporating a power and data switch control using wife or power line data to control a light paddle fan, light exhaust fan or light heater assembly upgrade replacing the light at base modular unit 556. Base modular units 558 and 560 may have dependent modular units having night lights, electrical outlets, speakers or other devices but may be repurposed by adding an additional dependent modular unit to one or both locations having a sensor for detecting environmental conditions, such as temperature, humidity, or particulates and provide a control signal to a light fan installed at base modular unit 554.

Base modular unit 562 may be a newly added power or data location or may be a pre-existing location for a thermostat for the structure's HVAC system, or a three way switch for the light originally installed at base modular unit 556 and may be upgraded or repurposed to provide ganged modules to provide both functions and/or provide a sensor for detecting if people are in the room used to determine the need for lighting as well as for any air control operations. Alternatively or additionally, it may be provided with a communication dependent modular unit or a video display dependent modular unit.

Base modular unit 566 may have a dependent modular unit with a smart floor outlet which is only provided with power when authorized by a remote switch, such as a switch on the circuit breaker or a virtual switch controlled by a cell phone or computer.

Base modular unit 568 may be provided with a dependent modular unit with a sensor detecting the presence of a pet and opening a pet door in response to a trained pet standing on it or engaging with in a manner that indicates a desire to have the door opened. Alternatively or additional, Base modular unit 568 may be connected to a dependent modular unit incorporating a powered vent fan connected to the central heating and cooling system which is activated upon detection, for example by a occupant sensor at base modular unit 562, that a person is in the room or by environmental sensors distributed throughout the structure detecting conditions and determining the independent air control needs of various spaces within the structure.

In general with regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Features shown or described in association with one configuration may be added to or used alternatively in another configuration. The scope of the devices and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future configurations. In sum, it should be understood that the device is capable of modification and variation and is limited only by the following claims.

All terms are intended to be given their broadest reasonable constructions and their ordinary meanings as understood by those skilled in the art unless an explicit indication to the contrary in made herein. In particular, use of the singular articles such as "a" and "the," should be read to recite one or more of the indicated elements unless a claim recites an explicit limitation to the contrary.

What is claimed is:

1. A modular unit for interconnection in a modular connector system, comprising:
    a plurality of modular units, each including a main body having a first side and a second side opposite the first side, an interface side perpendicular to the first and second sides and extending therebetween, and a longitudinal direction extending parallel to the first and second sides and perpendicular to the interface side;
    an electrical device mechanically connected to the main body between the first and second sides thereof and having an interface defining at least part of the interface side of the main body;
    a first elongated engagement configuration on the first side of the main body; the first elongated engagement configuration being elongated in the longitudinal direction;
    a second elongated engagement configuration on the second side of the main body, the second elongated engagement configuration being elongated in the longitudinal direction;
    a plurality of electrical contacts elongated in the longitudinal direction disposed on each of the first and second engagement configurations; and
    an elongated mechanical engagement feature on each of the first and second engagement configurations;
    the first and second elongated engagement configurations including pairs of engagement configurations being adapted for interconnection of a pair of the modular units by relative displacement therebetween such that the elongated mechanical engagement feature positions the engaged first and second engagement configurations in a manner to align the respective electrical contacts into electrical engagement when the respective engagement configurations are advanced into engagement such that the respective contacts are aligned and engaged at a range of relative positions of the main bodies along the longitudinal axis.

2. The modular unit of claim 1 wherein the mechanical engagement feature of the first engagement configuration comprises a longitudinal track on the first side of the main body and the mechanical engagement feature of the second engagement configuration including a longitudinal track follower on the second side of the main body.

3. The modular unit of claim 1 wherein the electrical device is electrically connected to the contacts of at least one of the engagement configurations for electrical communication therewith.

4. The modular unit of claim 3 wherein the electrical device is electrically connected to the contacts of both of the engagement configurations for electrical communication with both engagement configurations.

5. The modular unit of claim 4 wherein the electrical device receives electrical communication from the first engagement configuration and regulates the provision of the electrical communication to the second engagement configuration.

6. The modular unit of claim 3 wherein the electrical device and the second engagement configuration are in parallel electrical connection with the first electrical engagement configuration.

7. The modular unit of claim 1 wherein the interface comprises at least one of a user information interface, a user input interface, an environmental information interface, an environmental input interface, a data device interface, a communication device interface, and an infotainment interface.

8. The modular unit of claim 1 further comprising a wire clamping system for clamping wires of an electrical line having a plurality wires into electrical contact with the electrical contacts.

9. The modular unit of claim 8 wherein said wire clamping system comprises a cam shaft, a lever for rotatably driving the cam shaft and a plurality of cams mounted to the cam shaft, each rotatable with the cam shaft to drive a respective one of the wires into mechanical and electrical engagement with a respective one of the electrical contacts.

10. The modular unit of claim 8 wherein said wire clamping system comprises a plurality of electrically conductive rotatable shafts, each rotatably mounted to the main body and electrically connected to one of the electrical contacts and each having a feature engageable with of one of the wires of the power line, such that each wire may be mechanically secured to a respective electrically conductive rotatable shaft by rotation of the shaft.

11. The modular unit of claim 1 further comprising a template defining an aperture required in a wall surface, the template being integrally formed with the main body.

12. The modular unit of claim 11 wherein the template simulates the footprint of a standard electrical box and at least a portion of the template is severable from the main body when the template is no longer needed for creating the aperture.

13. The modular unit of claim 4 wherein the electrical connection is at least one of a data connection, a low voltage connection, a standard voltage infrastructure, and a high voltage connection, wherein the electrical connection includes at least one of multiple electrical devices, multiple power supply connectors, multiple power line connectors, and multiple dependent connectors, and wherein the dependent electrical connector is configured to restrict unintentional interconnection with the power supply connector of an electrically incompatible modular unit.

14. The modular connector system of claim 1 further comprising a locking mechanism selectively locking the main bodies against relative movement at any selected relative position in the range of relative positions in which the electrical contacts of the first and second engagement features are in electrical contact.

15. The modular unit of claim 1, an electrical device disposed within the main body and including a standard electrical component, further comprising
 a modular frame adapted to accept the standard electrical component, the modular frame having the mechanical engagement features required for the standard electrical component; and
 a plurality of wires disposed in the modular frame, each connected at one end to the electrical contacts of the first connector configuration and connectable at another end to the standard electrical component for delivering power from the electrical contacts to the standard electrical component.

16. The modular unit of claim 1 further comprising a plurality of additional contacts and a power line connector for securing each of the wires of a power line to a respective electrical contact, the power line connector being electrically interconnected with a plurality of the elongated contacts.

17. A modular unit for a wiring system including a base unit having a power supply connector, comprising:
 a main body,
 at least one electrical device disposed within the main body including a standard electrical component;
 a dependent connector for mechanically and electrically interconnecting the modular unit with a power supply connector;
 a plurality of wires disposed in a modular frame of the main body, each connected at one end to the electrical contacts of the dependent connector and at another end to the at least one electrical device for delivering power from the dependent connector to the electrical device;
 a circuit for delivering the power from the dependent connector to the power supply connector; and
 the modular frame adapted to accept the standard electrical component, the modular frame having mechanical engagement features required for the standard electrical component.

18. A modular connector system, comprising:
 a first main body and a second main body, each having a longitudinal direction along which the bodies are moved relatively for engagement;
 respective elongated engagement configurations on each of the main bodies adapted for mutual interconnection, the elongated engagement configurations being elongated in the longitudinal direction;
 a plurality of electrical contacts elongated in the longitudinal direction disposed on each of the engagement configurations; of the first and second main bodies;
 a longitudinal track on one the main bodies and a longitudinal track follower on the other of the main bodies for guiding the mechanical interconnection of the main bodies in a manner to align the respective contacts for engagement when the respective engagement configurations are advanced into engagement such that the respective contacts are aligned and engaged at a range of relative positions of the first and second main bodies; and
 a locking mechanism locking the main bodies against relative movement at any selected relative position in the range of relative positions.

* * * * *